US012571964B2

(12) United States Patent
Bickham et al.

(10) Patent No.: US 12,571,964 B2
(45) Date of Patent: Mar. 10, 2026

(54) SYSTEMS AND METHODS FOR REMOVING COATING FROM AN OPTICAL FIBER

(71) Applicant: CORNING RESEARCH & DEVELOPMENT CORPORATION, Corning, NY (US)

(72) Inventors: Scott Robertson Bickham, Corning, NY (US); Randy Larue McClure, Corning, NY (US); William James Miller, Horseheads, NY (US); Christopher Allen Page, Pine City, NY (US); Qi Wu, Painted Post, NY (US)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 492 days.

(21) Appl. No.: 17/884,313

(22) Filed: Aug. 9, 2022

(65) Prior Publication Data

US 2023/0038299 A1     Feb. 9, 2023

Related U.S. Application Data

(60) Provisional application No. 63/230,934, filed on Aug. 9, 2021.

(51) Int. Cl.
*G02B 6/245* (2006.01)
*G02B 6/25* (2006.01)
*G02B 6/46* (2006.01)

(52) U.S. Cl.
CPC .............. *G02B 6/245* (2013.01); *G02B 6/25* (2013.01); *G02B 6/566* (2023.05); *G02B 6/567* (2023.05)

(58) Field of Classification Search
CPC ................................... G02B 6/245; G02B 6/25
See application file for complete search history.

(56) References Cited

U.S. PATENT DOCUMENTS 4,866,251 A  *  9/1989  Jones ..................... G02B 6/245
                                                        392/382
5,948,202 A     9/1999  Miller
                        (Continued)

OTHER PUBLICATIONS

"AutoStrip II Mid Span Window Stripping Unit", 3SAE Technologies, Retreived on Oct. 3, 2022, www.3sae.com/products/3saeautostrip2.php.

(Continued)

*Primary Examiner* — Thomas A Hollweg
*Assistant Examiner* — Marc E Manheim
(74) *Attorney, Agent, or Firm* — Tamika A. Crawl-Bey

(57) ABSTRACT

Methods and systems for removing coatings from optical fibers. A system includes a gas source for providing gas, and a heater configured to heat the gas. The system includes a holder comprising first and second attachment features. The attachment features secure a coated optical fiber along a removal path. The system includes at least one nozzle connected to the gas source. The at least on nozzle is aimed in a nozzle direction that is towards the removal path at a pitch, such that the nozzle is non-perpendicular towards the removal path. The nozzle directs a continuous stream of heated gas towards the coated optical fiber causing the coating of the coated optical fiber to be removed. The methods and systems may employ a second nozzle that may be offset from the first nozzle angularly and/or laterally with respect to the removal path.

20 Claims, 23 Drawing Sheets

(56) References Cited

U.S. PATENT DOCUMENTS

| | | | | |
|---|---|---|---|---|
| 5,968,283 | A | 10/1999 | Walraven et al. | |
| 6,244,323 | B1 | 6/2001 | Miller | |
| 6,607,608 | B1 | 8/2003 | Vetrano et al. | |
| 6,799,383 | B2 * | 10/2004 | Wiley | G02B 6/566 |
| | | | | 34/463 |
| 10,353,149 | B2 * | 7/2019 | Chang | H01J 37/32669 |
| 11,982,852 | B2 * | 5/2024 | Tsuda | G02B 6/25 |
| 2002/0148559 | A1 * | 10/2002 | Beffroy | G02B 6/245 |
| | | | | 156/763 |
| 2008/0128084 | A1 * | 6/2008 | Dunwoody | G02B 6/245 |
| | | | | 156/763 |
| 2009/0223929 | A1 * | 9/2009 | Hirayama | G02B 6/245 |
| | | | | 156/345.41 |
| 2016/0115075 | A1 * | 4/2016 | Kötzing | C03C 25/68 |
| | | | | 216/24 |
| 2021/0364699 | A1 * | 11/2021 | Chang | H02G 1/1204 |

OTHER PUBLICATIONS

Park et al., "Noncontact Optical Fiber Coating Removal Technique With Hot Air Stream", Journal of Lightwave Technology, vol. 23, Issue 2, Feb. 2005, pp. 551-557.

* cited by examiner

SYSTEMS AND METHODS FOR REMOVING COATING FROM AN OPTICAL FIBER

PRIORITY APPLICATION

This application claims the benefit of priority of U.S. Provisional Application No. 63/230,934, filed on Aug. 9, 2021, the content of which is relied upon and incorporated herein by reference in its entirety.

FIELD

Embodiments of the present invention relate generally to removing coatings from optical fibers and, more particularly, to removing coatings from optical fibers using a continuous stream of heated gas.

BACKGROUND

Glass optical fibers have very small diameters and are susceptible to external influences such as mechanical stress and environmental conditions. To protect the optical fiber from such influences, it is provided with one or more coatings of a protective material.

Certain uses of optical fibers require that a portion of the coating be removed from an end of the fiber or a portion of the fiber that is remote from the ends. For example, to make a fiber optics coupler, coating is stripped from portions of at least two optical fibers, and the stripped portions are fused together in a side-by-side relationship. Notably, there are many other uses and needs for stripping a portion of a coated optical fiber.

It is important, however, that the stripped portions of the fibers do not become substantially weakened during the stripping process. Indeed, it is increasingly necessary to maintain integrity of the optical fiber and, thus, the coating stripping process should not substantially reduce fiber strength.

BRIEF SUMMARY OF THE INVENTION

Optical fibers are coated to improve fiber strength, while preventing fatigue and attenuation. The coatings may further protect the fibers from external abrasions, and environmental factors. Coated optical fibers are often bundled together to form an optical fiber ribbon. Optical fiber ribbons are made from a plurality of optical fibers, coated or uncoated, that have been encapsulated in a matrix material. To repurpose ribbons, the matrix must be removed from the ribbon. The present invention provides systems and methods for removing coatings and matrices from optical fiber cables and ribbons to enable further use thereof.

Coating can be manually stripped from an optical fiber by placing the fiber within a hand-held tool, bringing blades of the tool into contact with opposite sides of the coating layer, and then moving the tool relative to the axis of the coated optical fiber. The bare portion of the fiber usually needs to be wiped with a cloth wetted with alcohol or the like to remove particles of coating that have been deposited on the bare portion of optical fiber by the coating removal process.

These processes have various disadvantages. Processes that are adapted to remove coating only from the end of a coated fiber are often not useful for removing coating from regions remote from the fiber ends, a requirement for making fiber optic couplers. Mechanical strippers can cause scoring or scratching of the fiber surface. For example, the fiber surface can be scratched as the bare glass fiber without its coating is removed from the mechanical stripping device. Some stripping methods do not result in a clean demarcation between the stripped coating and the coating remaining on the fiber. If the stripping process results in a ragged or uneven coating termination, the resultant stripped fiber may not be useful for its intended purpose. Mechanical stripping can also contaminate the fiber surface, thus requiring a subsequent cleaning step to remove particulates. The wiping step can cause more damage to the fiber than the mechanical stripping step. Mechanical stripping that is manually performed is highly operator dependent as it is typically performed with a hand-held stripper.

Some coating removal processes employ a solvent, such as acetone, to soften and swell the coating so that it is more easily removed. Alternatively, a heater within the coating removal apparatus can also cause softening and swelling of the coating. Coating can also be removed by contacting the coated fiber with materials, such as sulfuric acid and hydrogen peroxide (to remove a polyester coating) or with sulfuric acid (to dissolve a polysiloxine coating).

Chemical stripping processes can be disadvantageous in that they are difficult to control, and they may leave contaminants or residual coating on the fiber surface. Chemical stripping can also be disadvantageous in that it utilizes dangerous caustic chemicals that need to be handled and disposed of. Moreover, chemicals can flow between the fiber and the coating that remains on the fiber just beyond the stripped region. It is particularly difficult to remove the coating from an array of optical fibers such as a ribbon or a circularly symmetric multi-fiber cable since coating material is situated between closely spaced fibers or between fibers and filamentary strength members in such cables.

Embodiments of the present invention provide improved systems and methods for removing coatings from coated optical fibers (e.g., single coated optical fibers, multiple optical fibers in the form of a ribbon, etc.). In this regard, embodiments of the present invention provide a clean, simple, and inexpensive system and method for removing a coating from a coated optical fiber cable or ribbon.

Some embodiments of the present invention provide a method of stripping coating from optical fibers in such a manner that the bare fiber surface is sufficiently clean that it does not have to be further wiped or treated before being used. A further object is to provide a method and system capable of removing coating from the end of an optical fiber, a region of the fiber remote from its ends, or from an entire length of optical fiber.

Embodiments of the present invention relate to a method for removing coating material from an optical fiber including at least one glass optical fiber surrounded by protective coating material. A continuous jet or stream of heated gas is directed onto that portion of the coating material that is to be removed. The composition of the gas is such that it does not react with the coating material. The temperature of the gas is sufficiently high that it softens the coating material, whereby the coating material is blown from the optical fiber.

The heated gas may be directed though a nozzle towards a portion of the coated optical fiber to remove the coating from the portion of the coated optical fiber. The portion of the coated optical fiber may be secured to a holder by a first and second attachment feature and define a removal path extending therebetween. The nozzle may be directed at a pitch angle, wherein the angle is non-perpendicular to the removal path. In some embodiments, the holder may move in relation to the removal path, while in other embodiments, the nozzle may move along the removal path.

In some embodiments, the gas source may supply an inert, preferably dry gas. In some embodiments, the gas may be filtered, such as to remove particulates that may be in the gas stream. In some embodiments, the gas may be heated within the nozzle or with a heater prior to entry into the nozzle. The nozzle may be positioned close to the surface of the optical fiber to decrease the temperature dissipation between exiting the nozzle and contacting the optical fiber. Attachment features may secure the optical fiber to a holder to expose the desired portion of the coated optical fiber to be stripped. In some embodiments, the system may include an exhaust system below the optical fiber to collect the expelled coatings from the coated optical fiber(s).

In some embodiments, the nozzle system may have multiple degrees of freedom about the removal path defining a series of unique nozzle directions. The nozzle may be configured to have a pitch and/or an angular offset about the removal path of the optical fiber. In some embodiments, the pitch angle may be measured from a plane perpendicular to the optical fiber and may be directed towards the relative direction of movement of the optical fiber (although the nozzle may alternatively be directed against the relative direction of movement of the ribbon). The angular offset is measured from directly above the removal path. In some embodiments the system may be configured to move relative to the removal path, while in other embodiments, the nozzle may be configured to move relative to the removal path.

In another example embodiment, multiple nozzles are used. In some embodiments, each nozzle has a unique nozzle direction. Additionally or alternatively, the nozzles may be angularly offset from one another with respect to the removal path. In some embodiments, such as to more accurately control coating removal and reduce the risk of degradation of the optical fiber, the nozzles may be linearly offset along the length of the removal path. In some embodiments, the exit features of each continuous stream of heated gas are the same while, in other embodiments, different streams of heated gas may be configured to have a specific, temperature, pressure, flow rate, and/or height above the optical fiber.

In an example embodiment, a system for removing a coating from a portion of a coated optical fiber is provided. The system comprises a gas source for providing gas, a heater configured to heat the gas to form heated gas, and a holder comprising a first attachment feature and a second attachment feature. The first attachment feature and the second attachment feature are configured to secure the coated optical fiber along a removal path such that the portion of the coated optical fiber is exposed between the first attachment feature and the second attachment feature. The system further includes at least one nozzle connected to the gas source, wherein the at least one nozzle is aimed in a nozzle direction that is toward the removal path at a pitch angle such that the nozzle direction is non-perpendicular to the removal path. The at least one nozzle directs a continuous stream of the heated gas towards the coated optical fiber to cause the coating of the coated optical fiber to be removed therefrom.

In some embodiments, the coated optical fiber is a ribbon with a plurality of coated optical fibers surrounded by a matrix.

In some embodiments, the holder is configured to be moveable parallel to the removal path relative to the continuous stream of the heated gas.

In some embodiments, the at least one nozzle is configured to be moveable parallel to the removal path.

In some embodiments, the at least one nozzle comprises a first nozzle and the continuous stream of the heated gas comprises a first continuous stream of heated gas. The system further comprises a second nozzle directing a second continuous stream of heated gas towards the coated optical fiber. The second nozzle is axially displaced about the removal path with respect to the first nozzle such that the first continuous stream of heated gas is aimed at a first point about a circumference of the coated optical fiber and the second continuous stream of heated gas is aimed at a second point about the circumference of the coated optical fiber. The first point is different than the second point. In some embodiments, the first nozzle and the second nozzle are offset along the removal path. In some embodiments, the first nozzle is positioned along the removal path downstream of the second nozzle such that the first continuous stream of heated gas contacts the coated optical fiber prior to the second continuous stream of heated gas. The first continuous stream of heated gas is directed toward the coated optical fiber at a flow rate and a temperature designed to only soften the coating of the optical fiber such that the first continuous stream of heated gas is not designed to fully remove the coating.

In some embodiments, the first nozzle directs the first continuous stream of heated gas towards the coated optical fiber at a first pitch angle, and the second nozzle directs the second continuous stream of heated gas towards the coated optical fiber at a second pitch angle. The first pitch angle and the second pitch angle are different.

In some embodiments, the first continuous stream of heated gas is heated to a first temperature between 200° C. and 300° C., and the second continuous stream of the heated gas is heated to a second temperature between 400° C. and 600° C.

In some embodiments, the system further comprises a collection device configured to collect removed coating of the coated optical fiber, wherein the collection device is radially opposite the at least one nozzle with respect to the optical fiber. In some embodiments, the system further comprises a vacuum associated with the collection device.

In some embodiments, the pitch angle is greater than 5 degrees when measured from a plane perpendicular to the removal path.

In some embodiments, the gas is an inert gas.

In some embodiments, the heater heats the gas to a temperature between 40° and 600° C.

In some embodiments, the at least one nozzle has a flow rate between 40 standard cubic feet per hour, and 80 standard cubic feet per hour.

In an example embodiment, the coated optical fiber has a diameter of less than 125 microns.

In another example embodiment, a method of removing a coating from a portion of a coated optical fiber is provided. The method comprises providing gas from a gas source; heating the gas with a heater; and securing the portion of the coated optical fiber in a holder between a first attachment feature and a second attachment feature. The coated optical fiber defines a removal path therebetween. The method further includes aiming a continuous stream of heated gas through at least one nozzle towards the holder. The at least one nozzle is directed towards the removal path at a pitch such that a direction of the at least one nozzle is non-perpendicular to the removal path. The method further includes moving at least one of the holder or the at least one nozzle relative to each other such that the continuous stream of heated gas passes from the first attachment feature, along the portion of the coated optical fiber, to the second attachment feature, thereby removing the coating along the portion. The continuous stream of heated gas begins over or at an edge of the first attachment feature to clean strip the coating from the coated optical fiber.

In some embodiments, the at least one nozzle is a first nozzle and a second nozzle, wherein the first nozzle and the second nozzle are offset from each other at least one of angularly or laterally with respect to the removal path.

In some embodiments, the method further comprises moving the holder perpendicular to the removal path such that the continuous stream of heated gas intersects the first attachment feature. The method further includes moving the holder perpendicularly away from the removal path upon the continuous stream of heated gas intersecting the second attachment feature.

In yet another example embodiment, a system for removing a coating from a portion of a coated optical fiber is provided. The system comprises a gas source for providing gas, a heater configured to heat the gas to form heated gas, and at least one nozzle connected to the gas source. The at least one nozzle is aimed to direct a continuous stream of heated gas towards the coated optical fiber. The system further includes a holder comprising a first attachment feature and a second attachment feature configured to secure the portion of the coated optical fiber therebetween. The coated optical fiber defines a removal path extending between the first attachment feature and the second attachment feature. The holder is moveable parallel to the removal path. The continuous stream of heated gas is configured to begin over the first attachment feature and cease over the second attachment feature so as to clean strip the coating from the coated optical fiber.

In yet another example embodiment, a system for removing a coating from a portion of a coated optical fiber is provided. The system comprises a gas source for providing gas, a heater configured to heat the gas to form heated gas, a holder comprising a first attachment feature and a second attachment feature. The first attachment feature and the second attachment feature are configured to secure the coated optical fiber along a removal path such that the portion of the coated optical fiber is exposed between the first attachment feature and the second attachment feature. The system further includes a first nozzle connected to the gas source, configured to aim a first continuous stream of heated gas towards the coated optical fiber in a first nozzle direction to cause the coating of the coated optical fiber to soften. The system further includes a second nozzle connected to the gas source, configured to aim a second continuous stream of heated gas towards the softened coating of the coated optical fiber in a second nozzle direction to cause the softened coating of the optical fiber to be removed therefrom and to expose the optical fiber. At least one of the holder or the first nozzle and second nozzle are configured to be moveable parallel to the removal path such that the first continuous stream of heated gas contacts the coating of the coated optical fiber before the second continuous stream of heated gas.

In some embodiments, the first continuous stream of heated gas has a first temperature and a first flow rate, and the second continuous stream of heated gas has a second temperature and a second flow rate. The first temperature is different than the second temperature, and the first flow rate is different than the second flow rate.

In some embodiments, the first nozzle direction and the second nozzle direction are angularly offset about the removal path.

In some embodiments, the system is configured to remove a substantial amount of the coating from the optical fiber.

BRIEF DESCRIPTION OF THE SEVERAL
VIEWS OF THE DRAWING(S)

Having thus described the invention in general terms, reference will now be made to the accompanying drawings, which are not necessarily drawn to scale, and wherein:

Figure 6A:
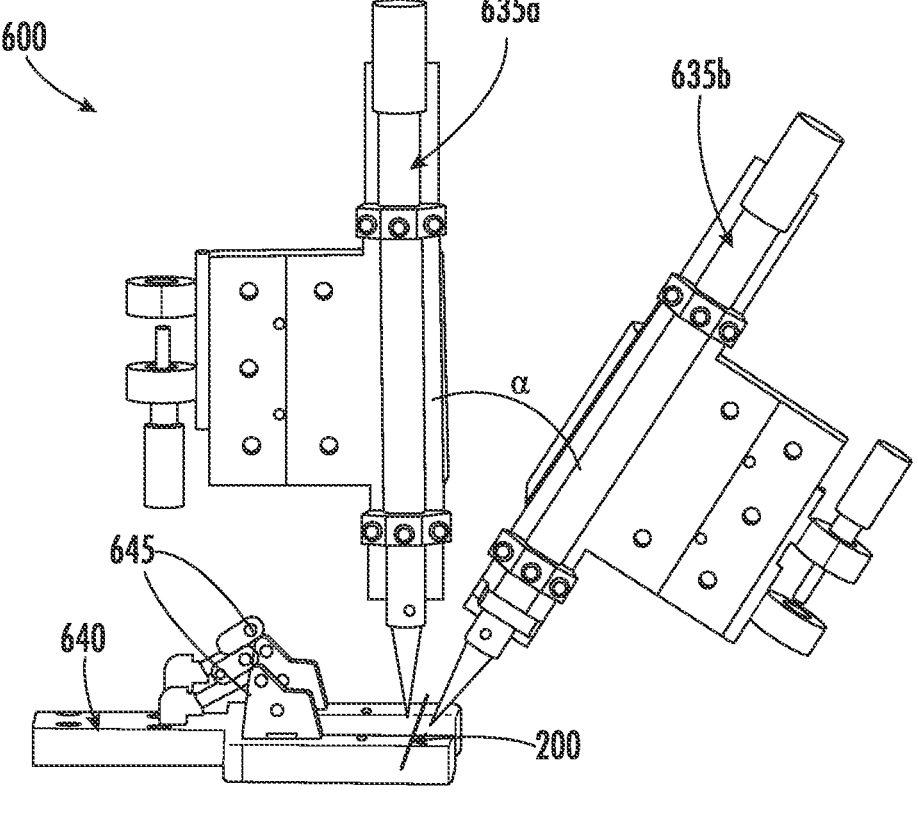
Figure 6B:
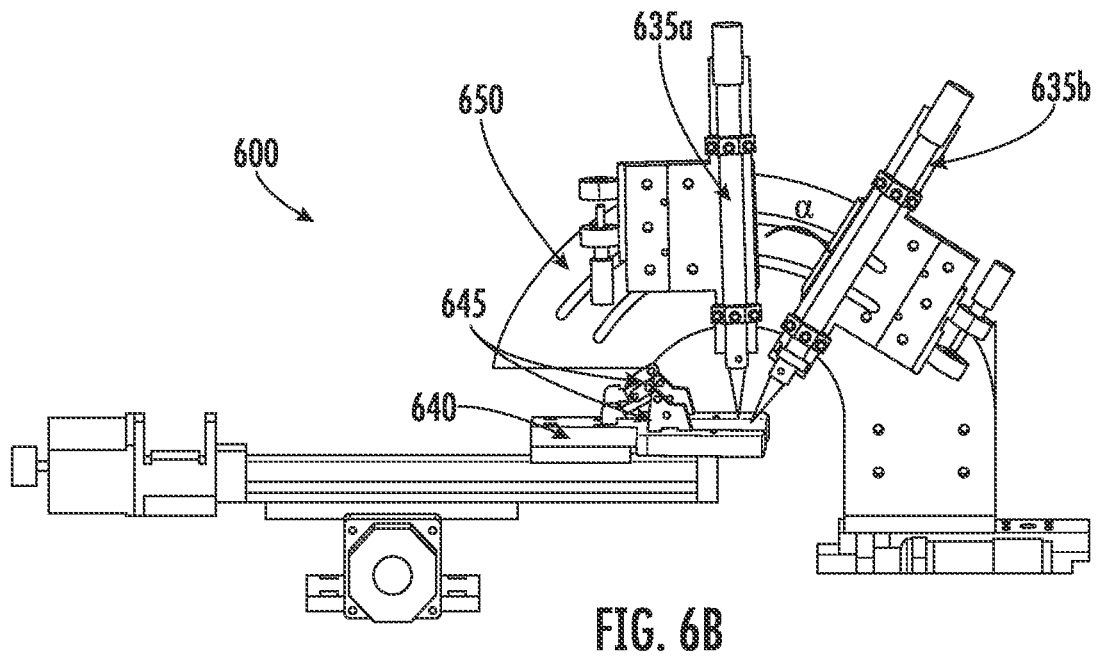
Figure 6C:
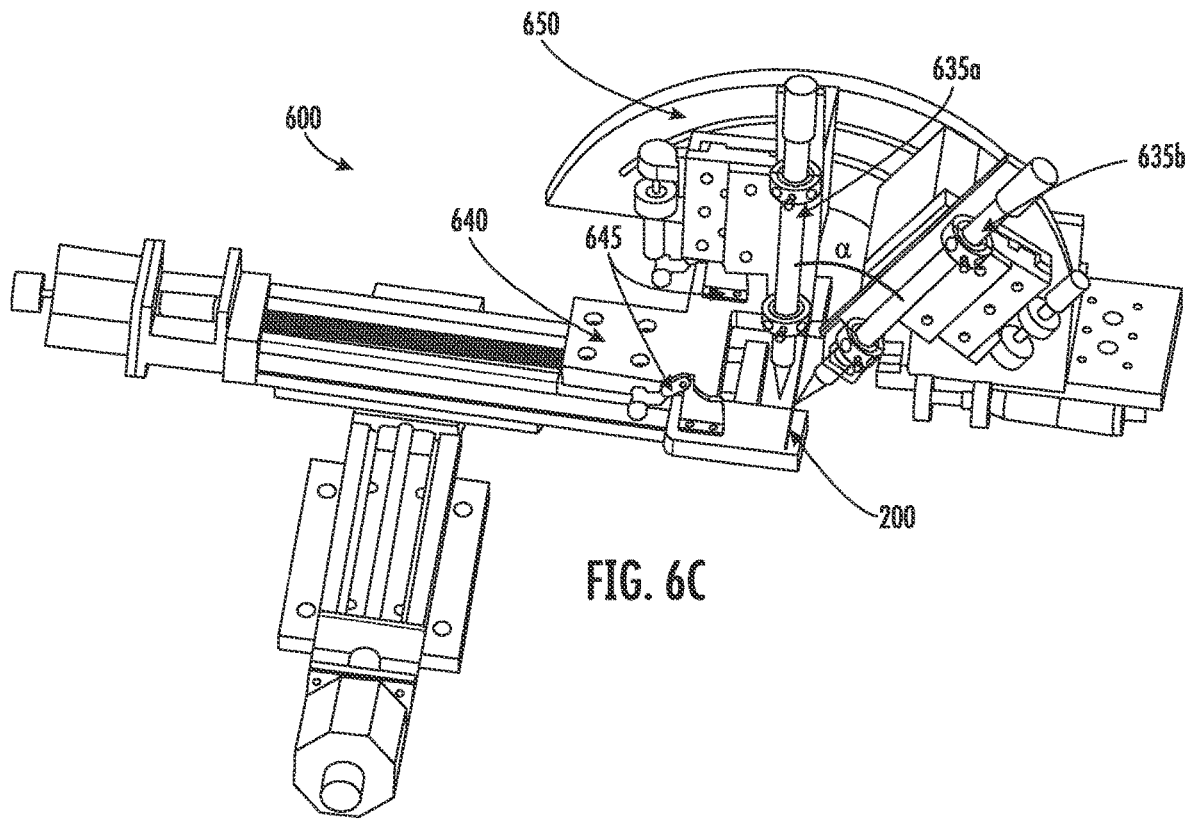
Figure 7A:
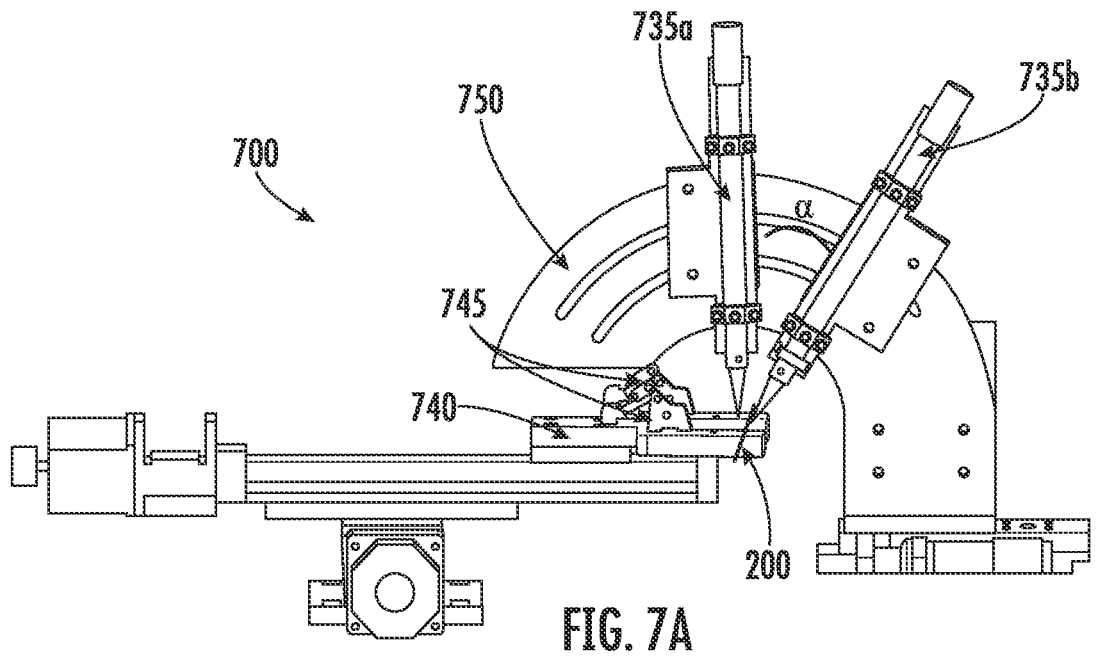
Figure 7B:
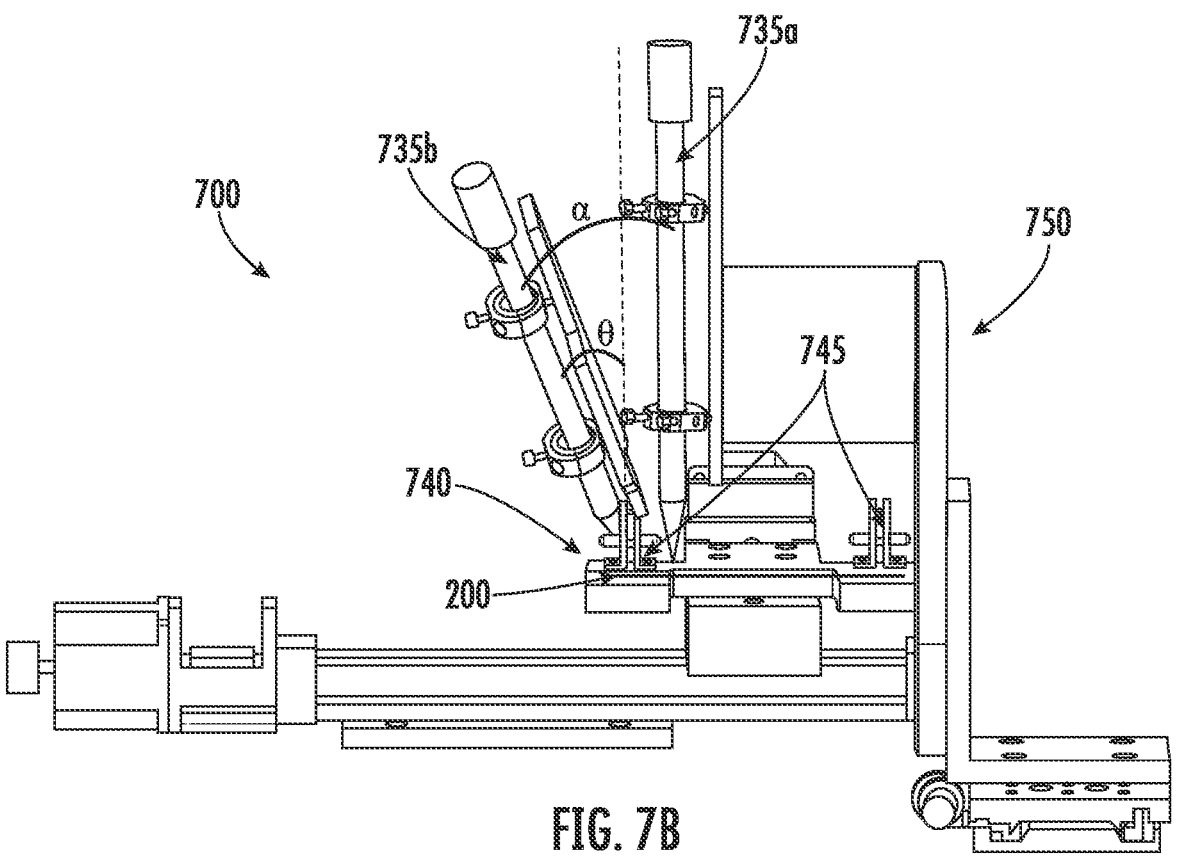
Figure 7C:
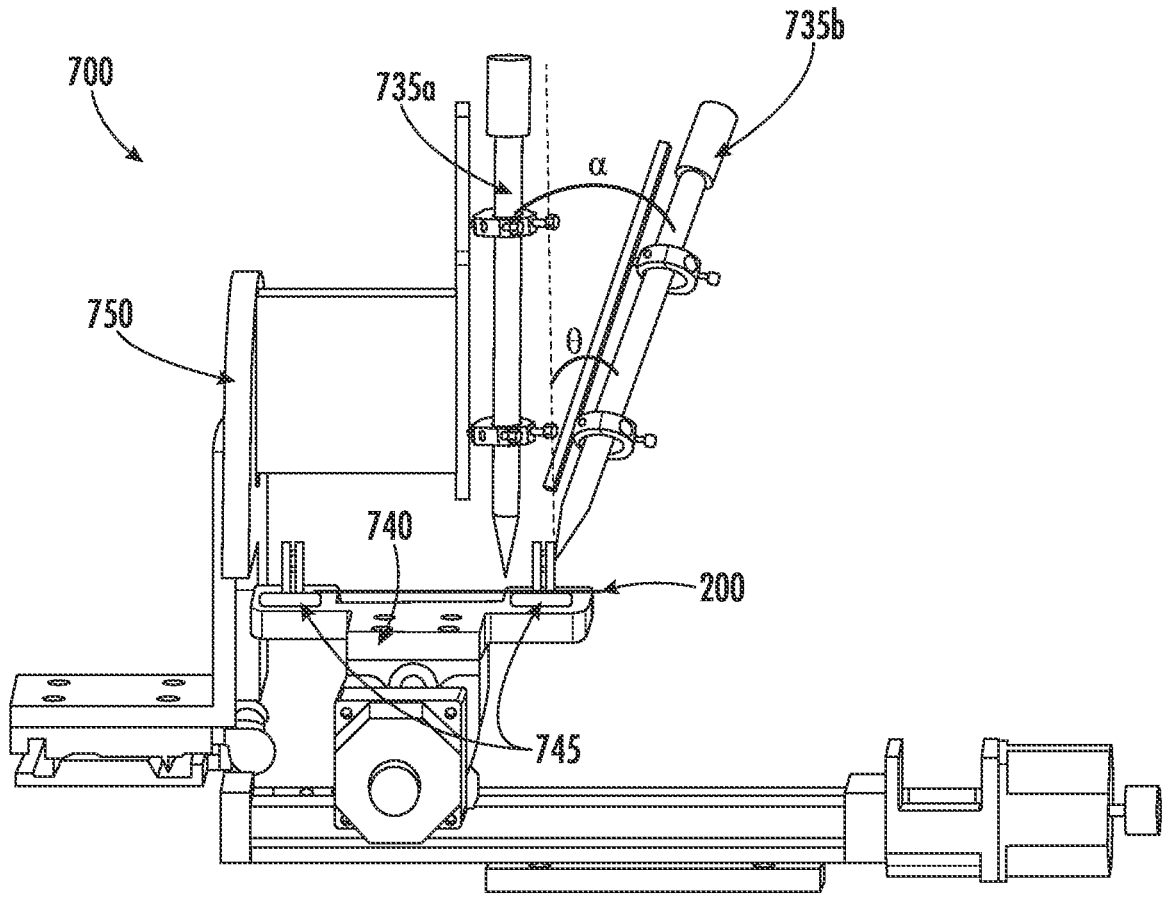
Figure 8A:
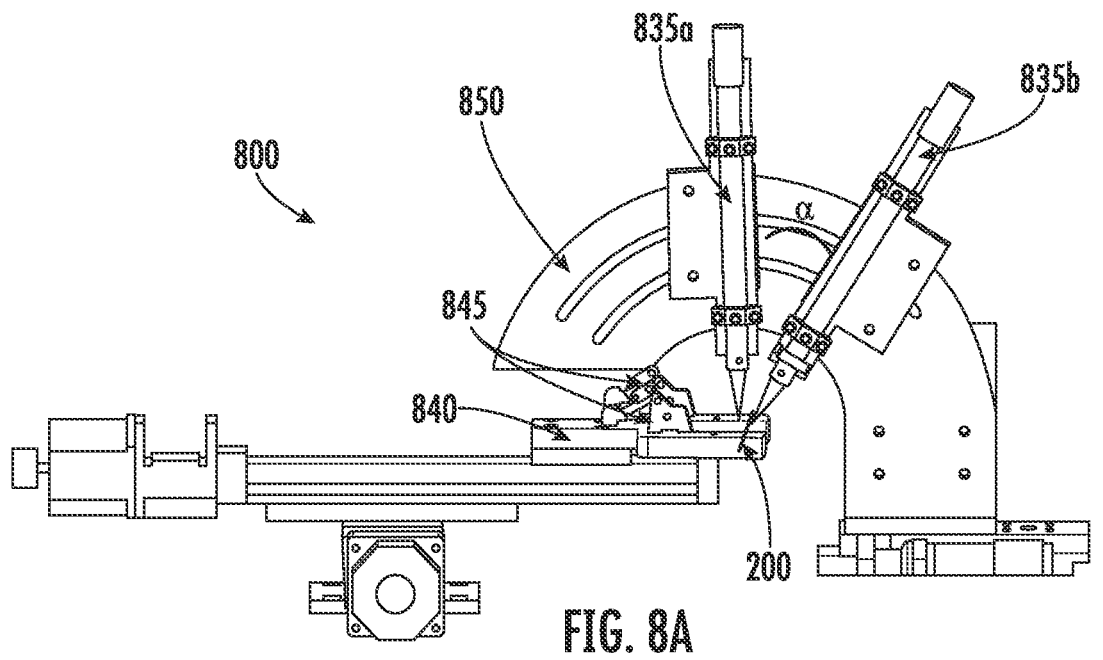
Figure 8B:
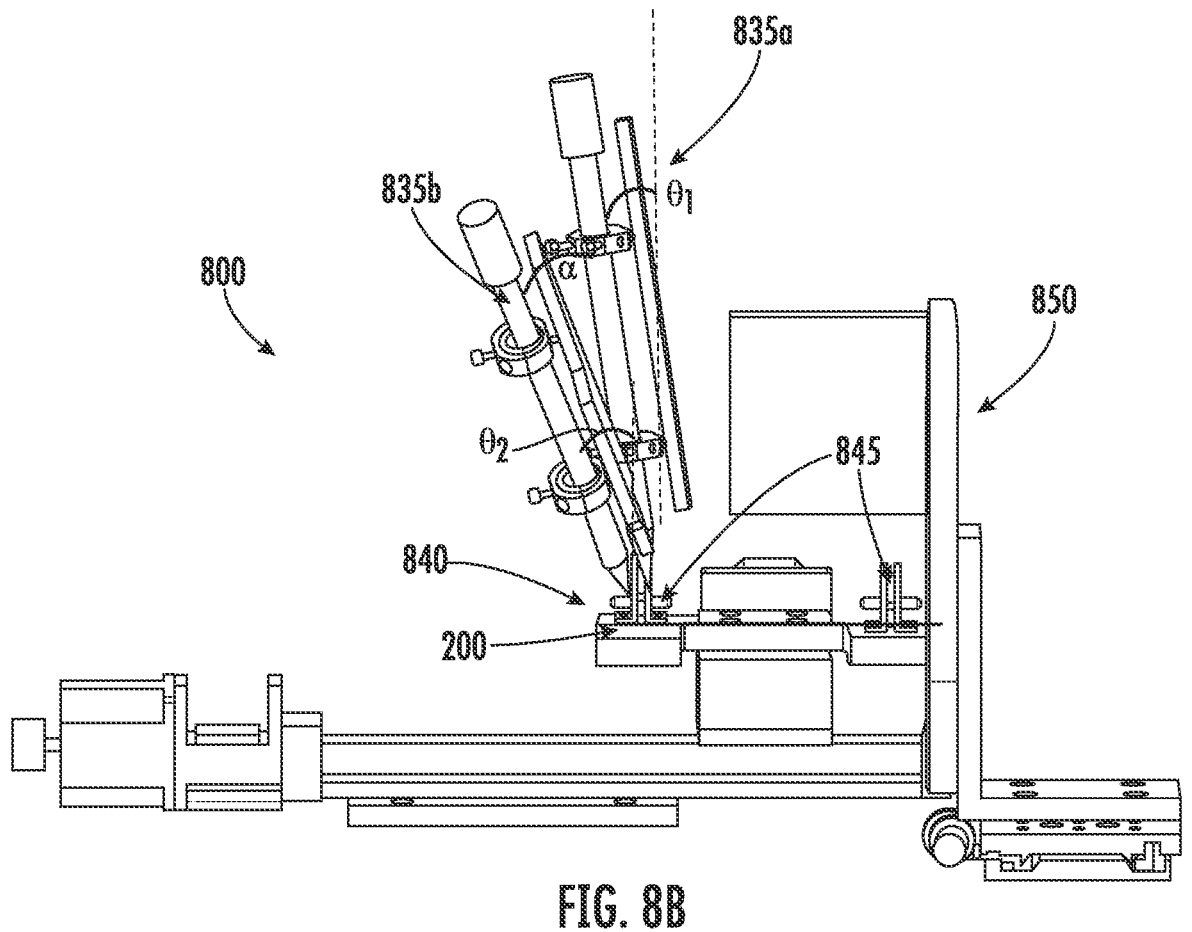
Figure 8C:
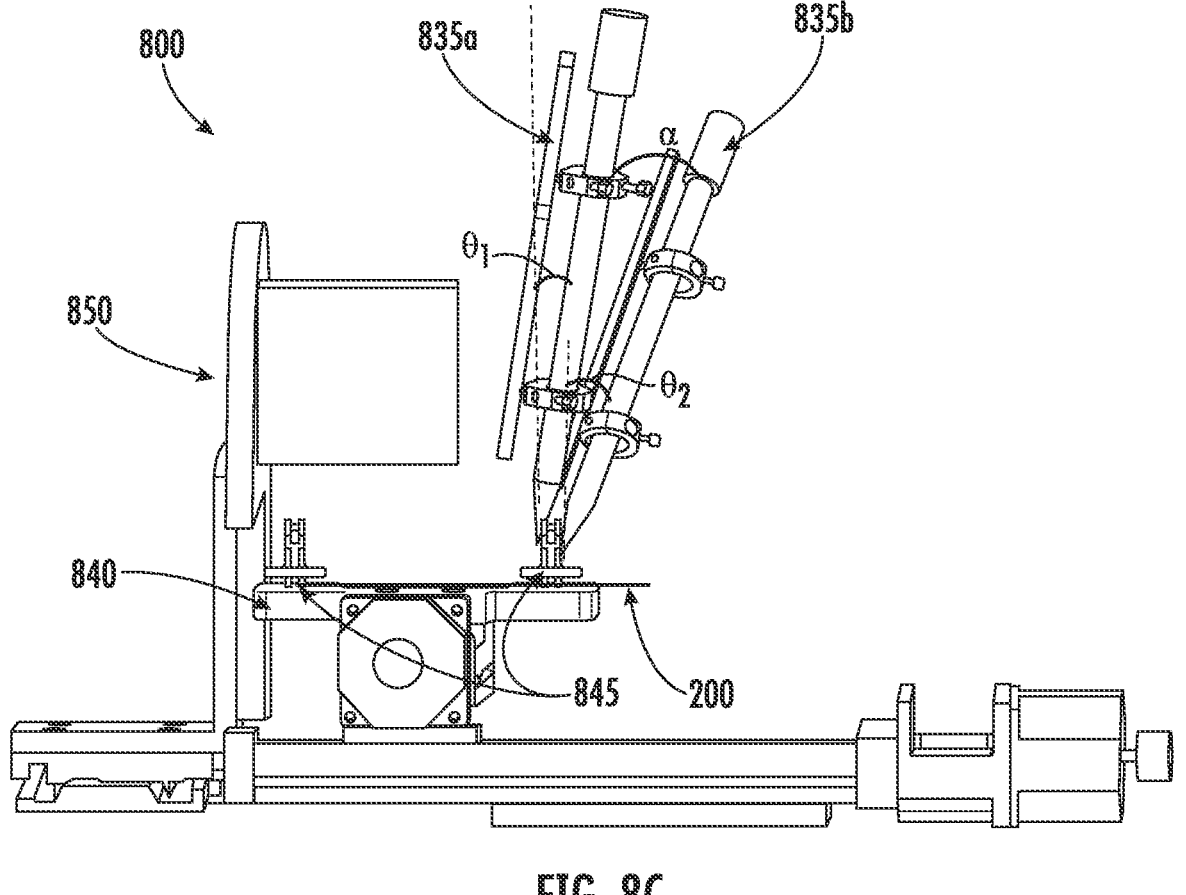
Figure 9:
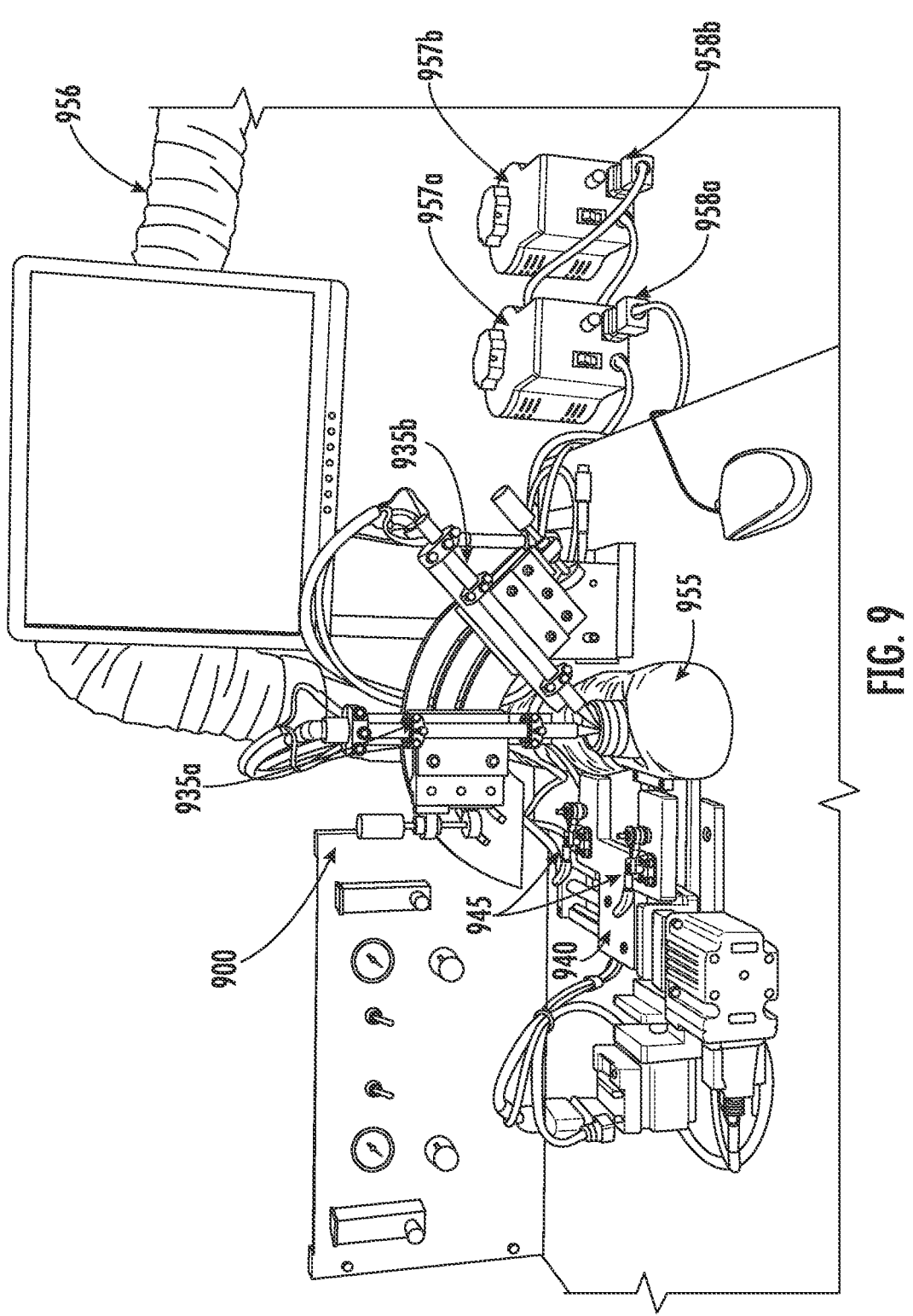
Figure 10A:
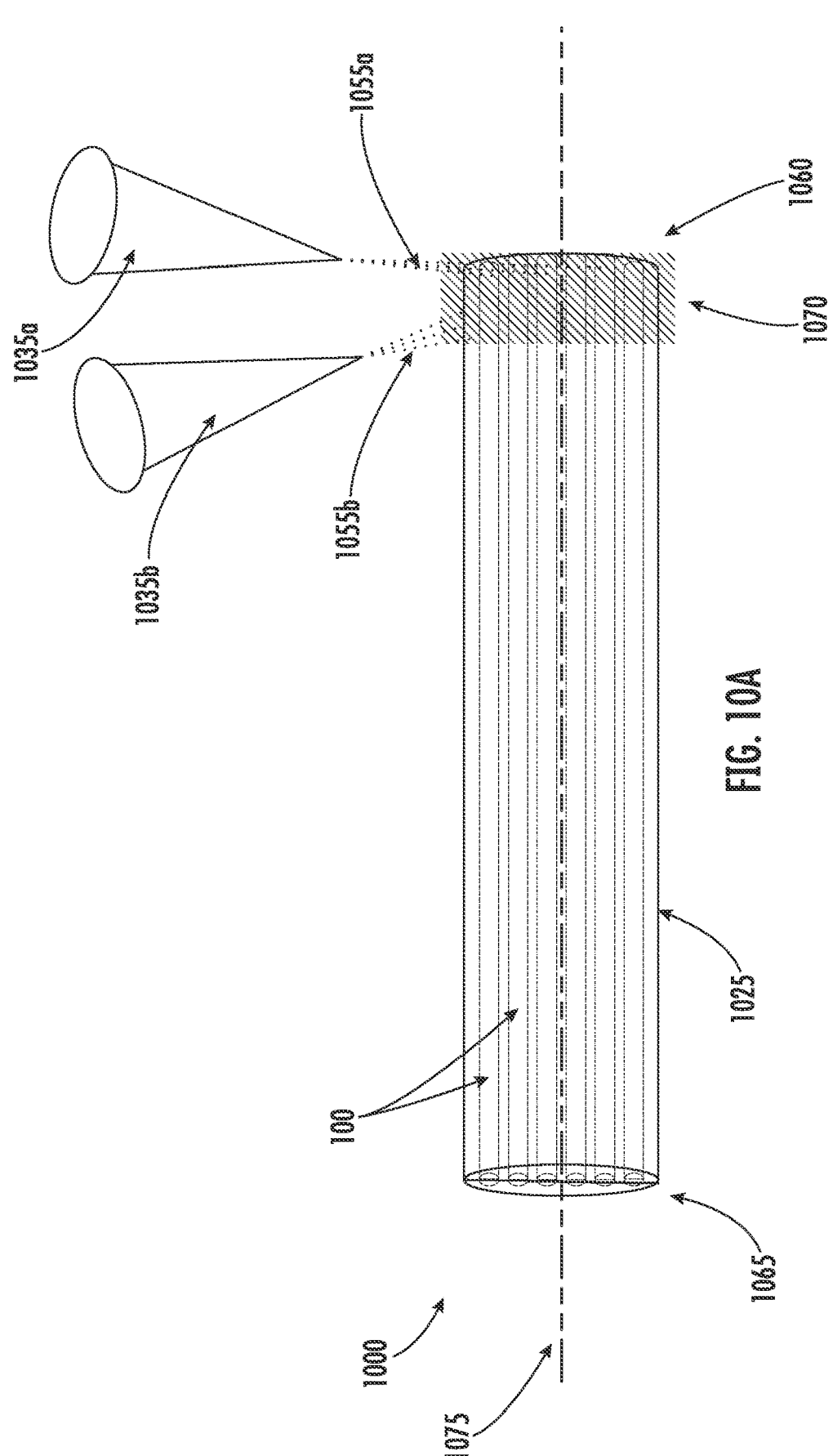
Figure 10B:
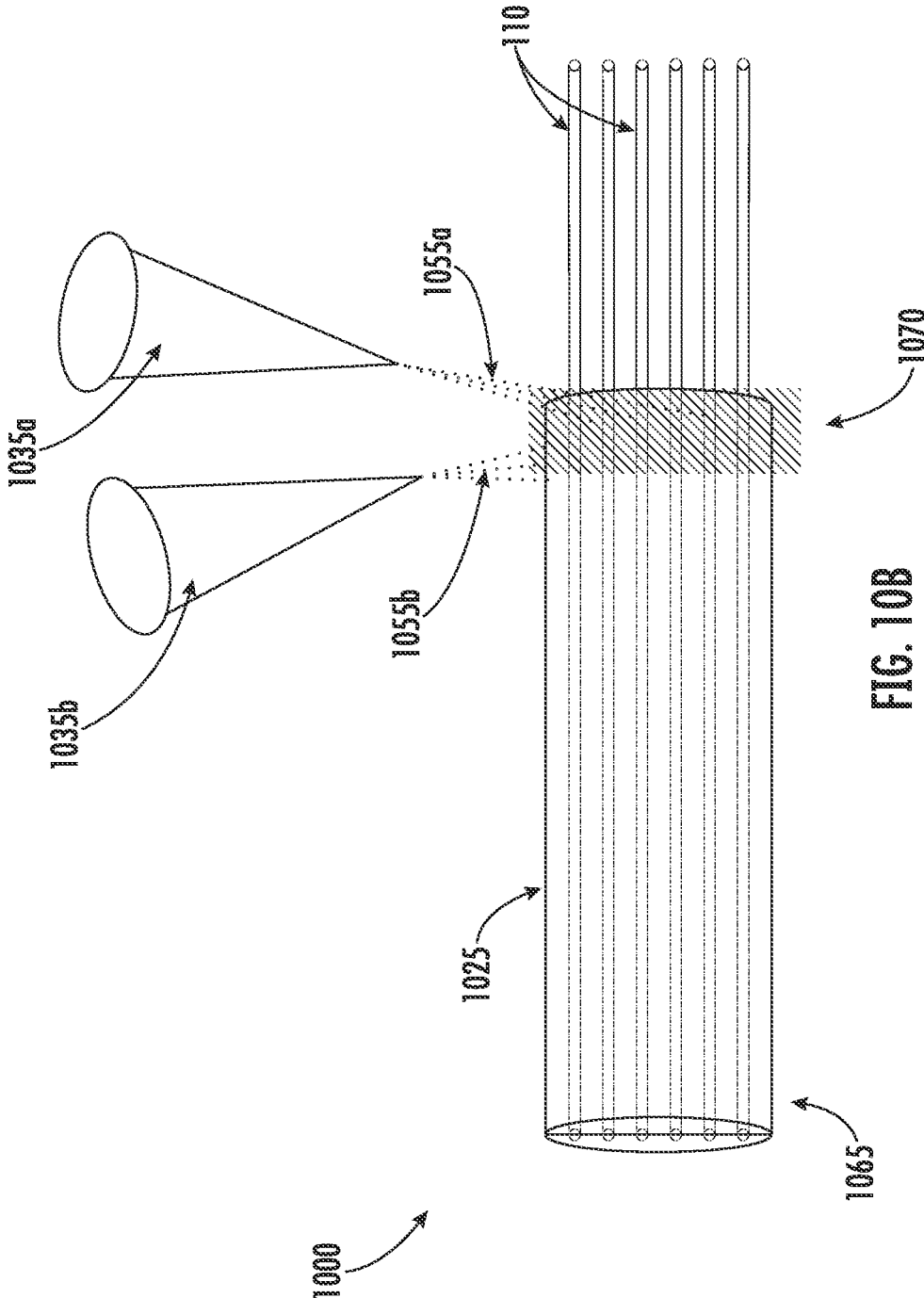
Figure 10C:
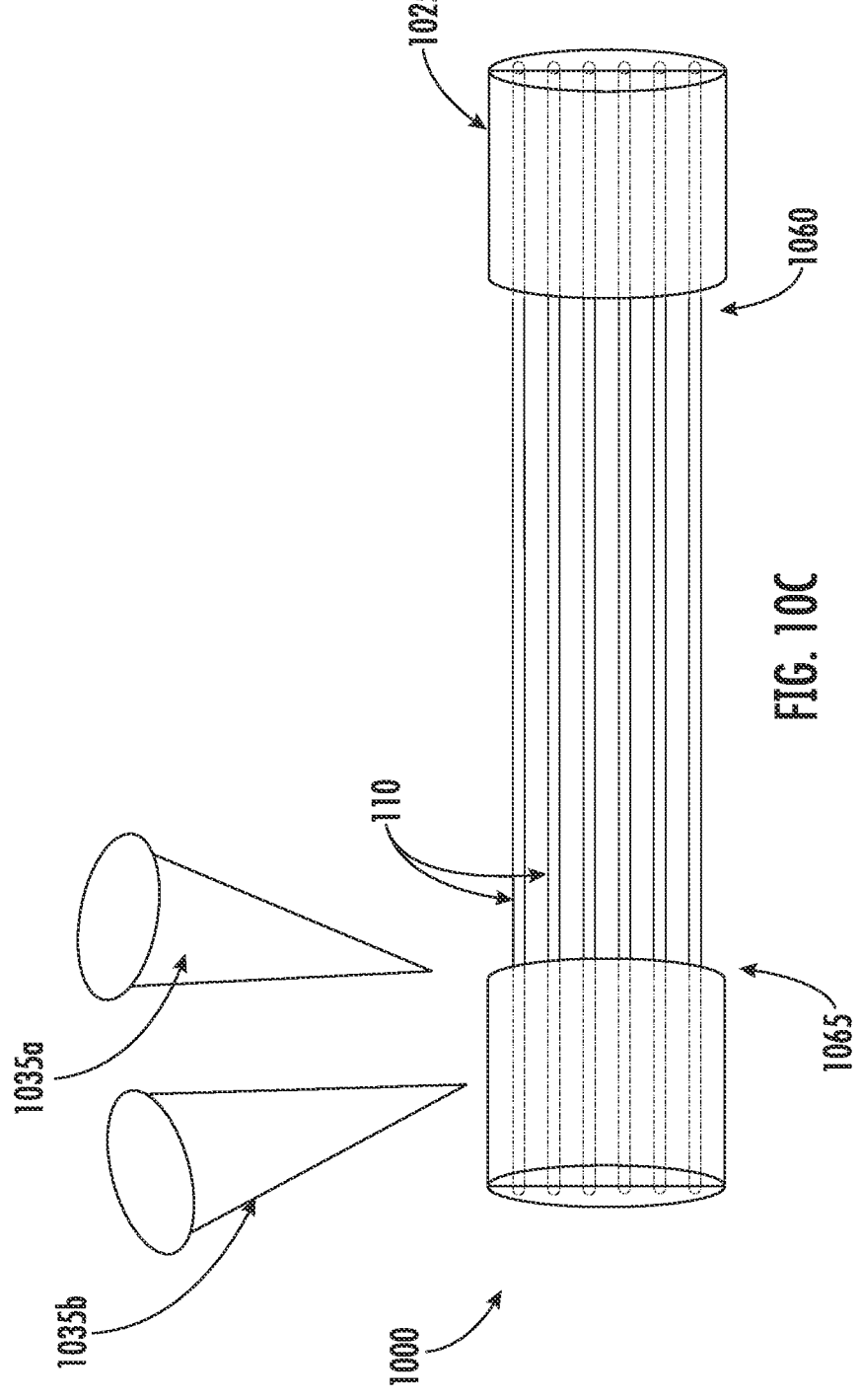
Figure 11:
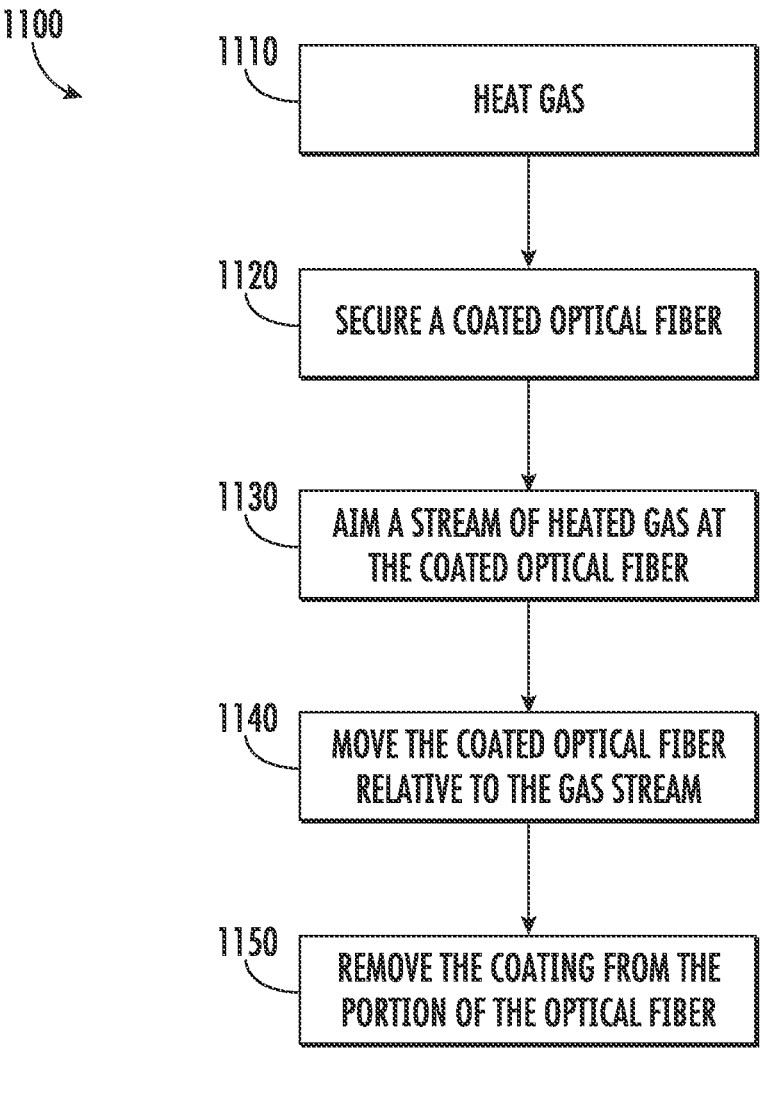

FIGS. 6A-6B each illustrate a front view of the dual nozzle system in accordance with some embodiments discussed herein;

FIG. 6C illustrates a top, perspective view of the dual nozzle system in accordance with some embodiments discussed herein;

FIG. 7A illustrates a front view of the dual nozzle system in accordance with some embodiments discussed herein;

FIGS. 7B-7C illustrate side views of the dual nozzle system in accordance with some embodiments discussed herein;

FIG. 8A illustrates a front view of the dual nozzle system in accordance with some embodiments discussed herein;

FIGS. 8B-8C illustrate side views of the dual nozzle system in accordance with some embodiments discussed herein;

FIG. 9 illustrates a front view of the dual nozzle system in accordance with some embodiments discussed herein;

FIG. 10A illustrates a schematic view of the dual nozzle system at a first position in accordance with some embodiments discussed herein;

FIG. 10B illustrates a schematic view of the dual nozzle system at a second position in accordance with some embodiments discussed herein;

FIG. 10C illustrates a schematic view of the dual nozzle system at a final position in accordance with some embodiments discussed herein; and FIG. 11 illustrates an example method in accordance with some embodiments discussed herein.

DETAILED DESCRIPTION

Some example embodiments will now be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout.

As used herein the term "coating" may refer to one or more polymer layers about an optical fiber. The term may be used to encompass a coating on a coated optical fiber, and the matrix of an optical fiber ribbon.

Optical fibers are coated to improve fiber reliability and maintain fiber strength, while preventing fatigue and attenuation. The coatings may further protect the fibers from external abrasions, and environmental factors. Optical fibers may be used in wavelength selective switches, and optical fiber ribbons may be used as array connectors, and in applications where there is limited space.

Figure 1A:
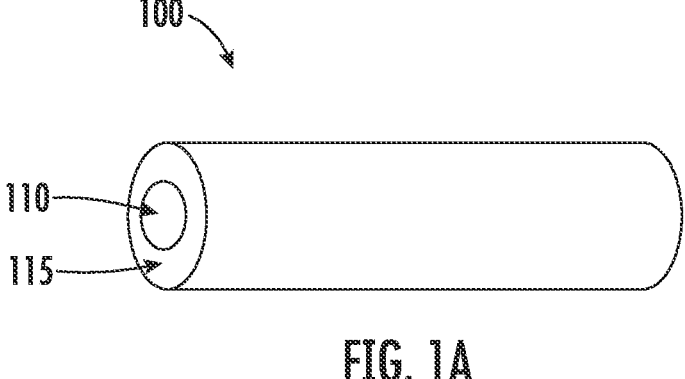
FIG. 1A illustrates a perspective view of a coated optical fiber in accordance with some embodiments discussed herein.
Figure 1B:
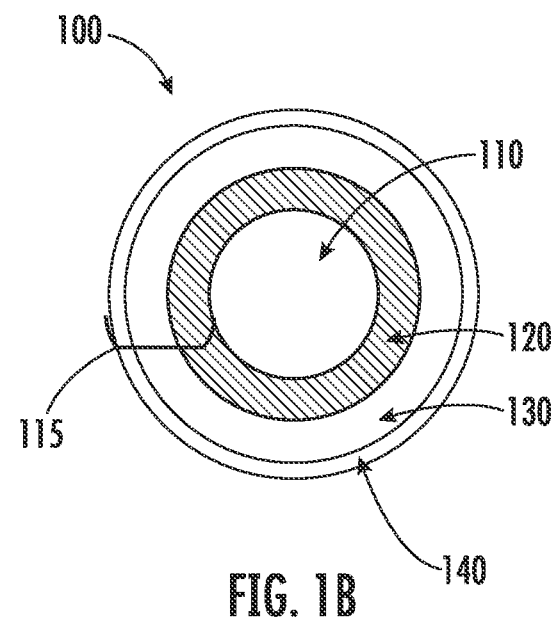
FIG. 1B illustrates a cross-section of the coated optical fiber shown in FIG. 1A, where a coating section is shown in multiple portions, in accordance with some embodiments discussed herein.

A coated optical fiber is illustrated in FIG. 1A. The coated optical fiber 100 includes an optical fiber 110 surrounded by a coating 115. In some embodiments, the coating may include multiple coating layers. FIG. 1B illustrates a cross sectional view of a coated optical fiber having multiple layers. The coated optical fiber 100 includes an optical fiber 110, an inner coating layer 120, an outer coating layer130, and a color identifier 140. In some embodiments, the inner coating may be a soft primary polymer coating, the outer coating may be a protective secondary polymer coating, and the color identifier may be a thin colored layer of marking ink (e.g., in a polymer base) for fiber identification within a ribbon. Each of the coating layers may have different properties.

In some embodiments, the inner coating layer 120 may be a soft material designed to buffer or dissipate stresses that result from forces applied to the coated optical fiber. The inner coating may be a material with a Young's modulus less than 1 MPa, less than 0.5 MPa, or less than 0.2 MPa. In some embodiments, the inner coating may have a degradation temperature between 200° C.-375° C., between 250° C.-350° C., or between 300° C.-350° C. In some embodiments, the degradation may be a weight percentage degradation of approximately 30%.

In some embodiments, the outer coating layer 130 may be a harder material with respect to the inner coating layer 120. The outer coating may be designed to protect the optical fiber 110 from damages caused by abrasions or external forces that arise during processing, handling, and installations of the coated optical fiber 100. In some embodiments, the outer coating layer 130 may have a Young's modulus of greater than 1000 MPa, greater than 1250 MPa, greater than 1500 MPa, or greater than 1750 MPa. In some embodiments the outer coating may have a degradation temperature between 300° C.-450° C., between 325° C.-425° C., or between 350° C.-400° C.

In some embodiments, the color identifier 140 may include pigments or coloring agents to mark the coated optical fiber 100 for identification purposes. In some embodiments, the color identifier 140 may indicate the type of underlying fiber, the diameter of the fiber, or the connection points of the optical fiber. In some embodiments, the color identifier layer 140 has similar physical properties to the outer coating layer 130. In other embodiments, the outer coating layer 130 may include pigments or coloring agents.

In some embodiments, the coated optical fiber 100 may include a cladding having a refractive index profile that differs in inner layer 120 and outer layer 130. The design of the refractive index profile of the cladding may include a refractive index trench that diminishes the sensitivity of the coated fiber to bending, which may enable use of an inner layer 120 and/or outer layer 130 with reduced thickness relative to commercially available fibers, e.g. smaller than 125 microns. The thinner coating thickness of tire optical fiber embodiments described herein advantageously provides compact coated fibers that can be densely packed and/or readily installed in existing fiber infrastructures. The mechanical properties of the inner layer 120 are selected such that good micro-bending performance of the coated fiber is achieved, even when the thickness of the inner layer 120 is reduced. The mechanical properties of the outer layer 130 are selected such that good puncture resistance of the coated fiber is achieved, even when the thickness of the outer layer 130 is reduced.

Coated optical fibers are often bundled together to form an optical fiber ribbon. Optical fiber ribbons are made from a plurality of optical fibers, coated or uncoated, that have been encapsulated in a matrix material. In some embodiments, the matrix material may be a polymeric material, while other suitable materials are also contemplated. In some embodiments, optical fiber ribbons may have a single matrix layer, while in others the ribbon may have multiple matrix layers.

Figure 2A:
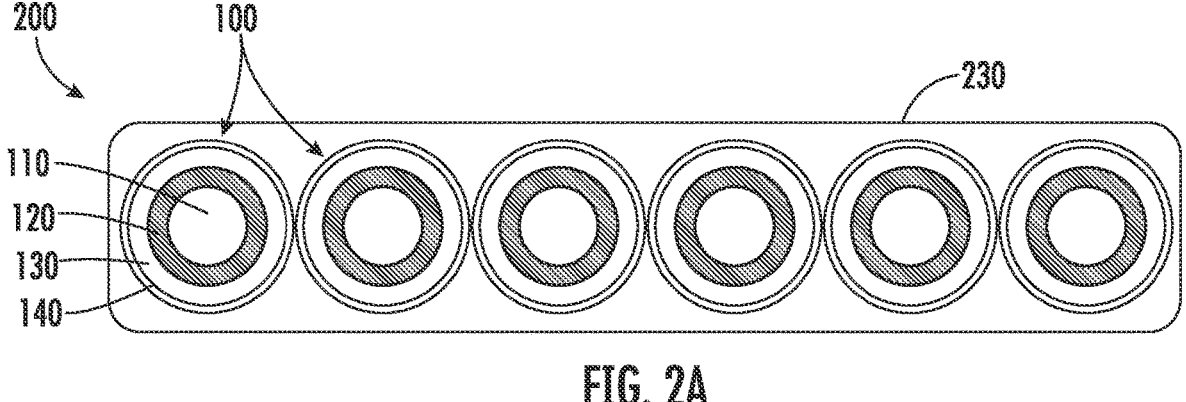
FIG. 2A illustrates a cross-section of a ribbon of a plurality of coated optical fibers in accordance with some embodiments discussed herein.
Figure 2B:
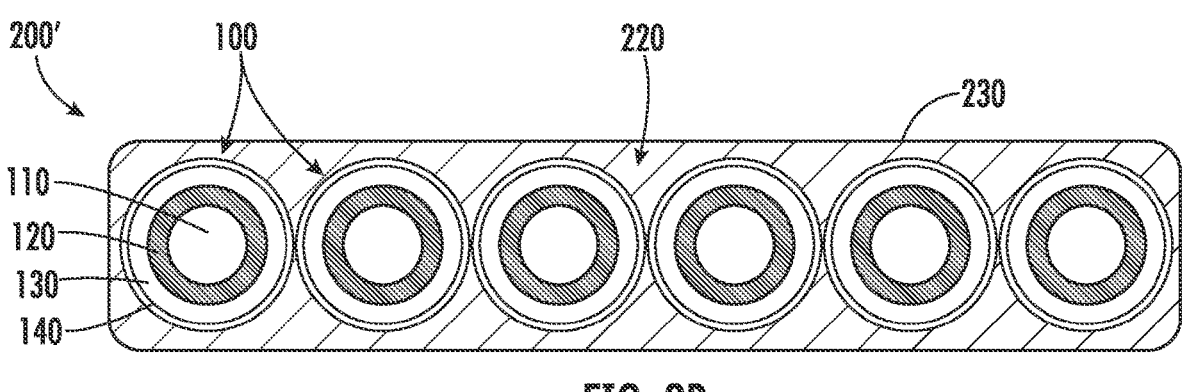
FIG. 2B illustrates a cross-section of a ribbon of a plurality of coated optical fibers in accordance with some embodiments discussed herein.

FIGS. 2A & 2B illustrate optical fiber ribbons. FIG. 2A illustrates a ribbon 200 with an outer matrix 230. The outer matrix 230 secures the coated optical fibers 100 in a planar array. Embodiments utilizing a single matrix may have poor planarity and/or result in a high degree of twist, both of which are undesirable for maintaining connections.

In some embodiments, optical fiber ribbons may have multiple matrix layers. FIG. 2B illustrates ribbon 200' comprising an outer matrix 230 and an inner matrix 220. The inner matrix may be a softer material and have a relatively low elastic moduli and may have similar properties to the inner layer of a coated optical fiber. In an application, the inner matrix may be applied about the coated optical fibers first. The inner matrix may be cured by UV, heat, or other suitable method. After application, the secondary matrix, may be applied and cured in a similar method. In some embodiments, the secondary matrix has a higher elastic modulus compared to the inner matrix. The secondary matrix may also be a hard protective coating, and exhibit properties similar to those of the outer layer of the coated optical fiber.

To repurpose ribbons, the matrix may need to be removed from the ribbon. In some embodiments, it may be desired to remove the matrix from an end portion of a ribbon. In other embodiments, it may be desired to remove the matrix from a portion of the ribbon removed from the ends (e.g., a center portion). Peel is an undesired result wherein more than the desired portions of the matrix is removed from the ribbon, and the matrix is still connected to the remaining matrix. In order to repurpose the ribbon, it is desired for the removed section to have a clean cut, and not result in excess matrix remaining about the removal area.

Figure 3:
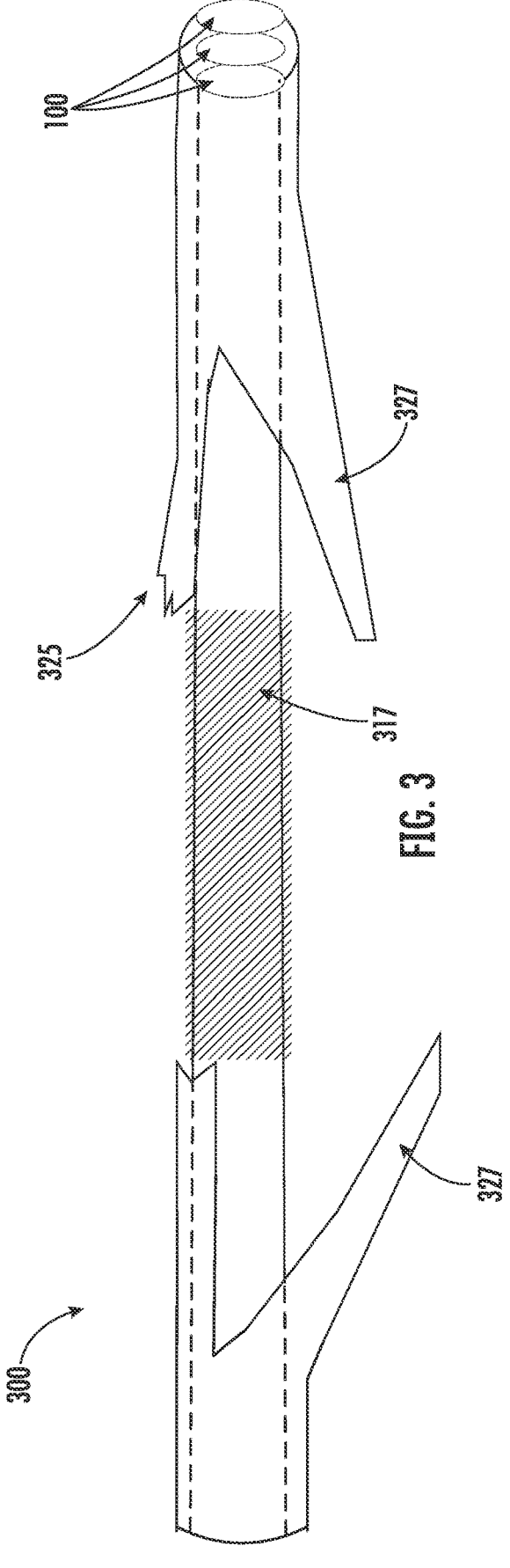
FIG. 3 illustrates a perspective view of a banana peel failure in accordance with some embodiments discussed herein.

FIG. 3 illustrates a ribbon 300 with a portion of the matrix 325 removed, resulting in peel 327 on both sides of the desired removal area 317. The imprecision results in undesired exposure of the optical fibers 110, and peel 327 about the optical fibers 110. The peel 327 may make it harder to repurpose the fibers. The present invention removes the peel effect leaving clean edges, and the desired removal area substantially stripped of the matrix, see FIG. 10C. Notably, while the above example detailing "peel" is shown with respect to removal of a matrix of a ribbon, it has been observed that "peel" can also occur with respect to removal of a coating of a single optical fiber.

Example Systems

Embodiments of the present invention provide for removing a coating from an optical fiber, which may include removing all coating or some of the coating and may be applicable to a single coated optical fiber or multiple optical fibers, such as in a ribbon.

Removing a matrix from a ribbon, and/or a coating from a coated optical fiber, as discussed above, may be accomplished through a heated gas stripper. To remove the coating, a stream of heated gas may be directed at the coated optical fiber(s), thereby heating the polymer coating(s). As the temperature of the inner coatings rises, bubbles may form within the polymer coating, and apply stress to the outer coatings. Once the pressure is high enough the bubble may burst resulting in removal of the coating(s).

Figure 4A:
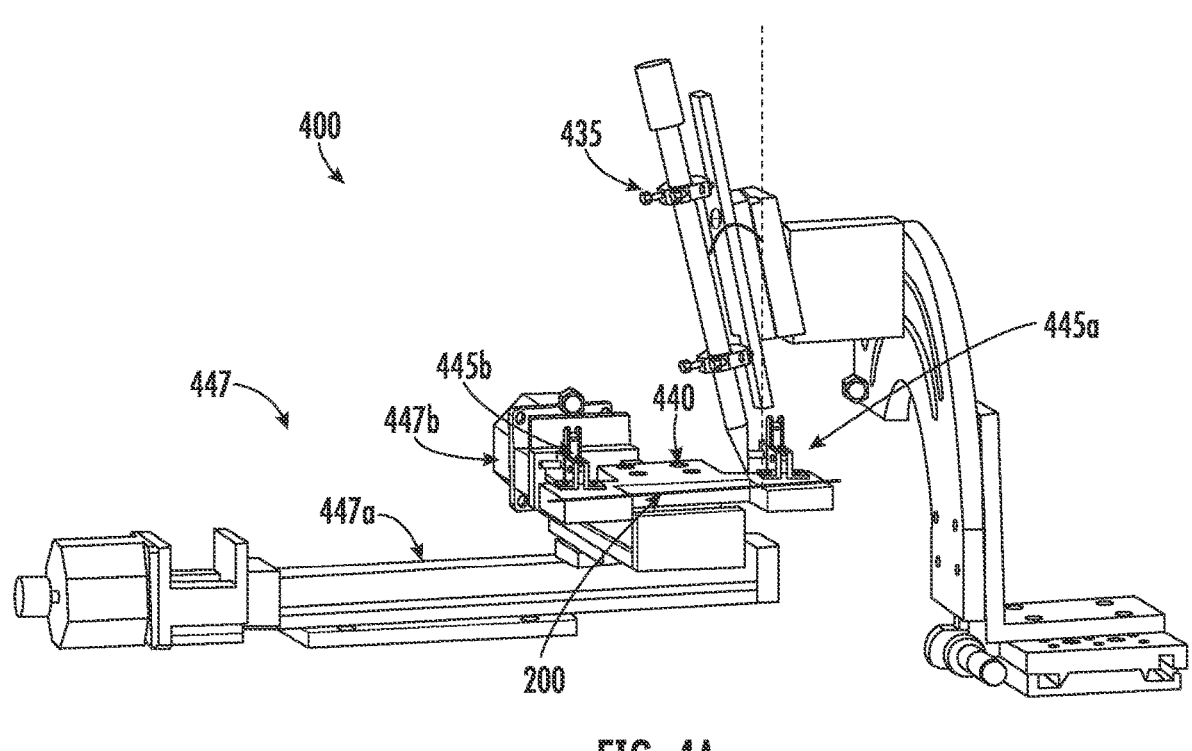
FIG. 4A illustrates a perspective view of the single nozzle system in a first position in accordance with some embodiments discussed herein.

A heated gas stripper may include at least one nozzle with multiple degrees of freedom about the item being stripped. FIG. 4A illustrates a perspective view of an example configuration of system 400 for removing a coating and/or a matrix from a coated optical fiber, and/or a ribbon in a first position. The system 400 may include a nozzle 435 connected to a gas source. The gas source may supply an inert gas to the nozzle 435, and a heater may be configured to heat the gas to a desired temperature. In some embodiments, the heater is within the nozzle, while in other embodiments the heater may be attached to the nozzle 435 and/or attached to the gas line or gas source.

The gas source may supply an inert, preferably dry gas, and more preferably a dry particle free gas. An inert gas may inhibit any chemical reaction between the heated gas and the hydrocarbons in the coating and/or matrix, which may minimize the risk of producing carbon particulates that adhere to the surface of the stripped optical fiber. In some embodiments, the gas may contain less than 10 ppm $O_2$, less than 7 ppm $O_2$, or less than 5 ppm $O_2$. In some embodiments, to insure there is minimal degradation of the mechanical reliability of the optical fiber the gas should be dry. In some embodiments, the gas may contain less than 10 ppm $H_2O$, less than 7 ppm $H_2O$, less than 5 ppm $H_2O$, or less than 3 ppm $H_2O$. Degradation of the coating(s) may occur more rapidly at an elevated temperature, for example, above 300° C. In some embodiments, a gas which is insoluble in liquid, for example nitrogen, is preferred, as molecules from the heated gas stream may be incorporated into the bubble along with the volatilized constituents of the coatings, which may speed up the bubble development, and therefore the process.

In an example embodiment, the gas may be heated to 700° C. within the heater and directed through the nozzle at 60 standard cubic feet per hour (SCFH) at 90 psi. At ambient conditions, the gas cools to a temperature between 400° C. and 600° C., preferably between 400° C. and 500° C. by the time the gas exits the nozzle. The nozzle may be placed about 1 mm above the optical fiber, and the optical fiber may have a relative velocity of 2.5 mm/s for up to 4 seconds. In some embodiments, the optical fiber may have a relative velocity ranging from 1 mm/s to 10 mm/s, although other ranges of relative velocity are contemplated (e.g., 1 mm/s to 7 mm/s, 2 mm/s to 4 mm/s, etc.). In some embodiments, the optical fiber may have the relative velocity for a minimum amount of time such as 1 second or greater, 2 seconds or greater, 0.5 seconds or greater, etc. In some embodiments, the optical fiber may have the relative velocity for a maximum amount of time such as 5 seconds or less, 4 seconds or less, 10 seconds or less, etc. In some embodiments, the optical fiber may have the relative velocity within a range of times, such as 1 second to 4 seconds, 0.5 seconds to 10 seconds, etc.

The system 400 may further include a holder 440. The holder 440 may define an irregular shape having a base, and two arms. The arms may extend parallel to each other and be substantially symmetrical to each other. In an embodiment, the arms may be rectangular in shape, while in other embodiments the arms may be substantially triangular. The arms may define a removal area therebetween. In some embodiments, the arms may be shaped such that the width of the removal area changes as the arms extend from the base.

Each of the arms may include an attachment feature 445a, 445b removably secured onto the holder 440. In some embodiments, the attachment features 445a, 445b may be detachable on the arms to change the length of the portion of optical fiber to be subject to the heated gas stripper. The attachment features 445a, 445b may be made from metal, or another suitable material which may not degrade by the heat or the composition of the gas expelled through the nozzle 435. In the illustrated embodiments, a ribbon 200 may be secured onto the holder 440 by the two attachment features 445a, 445b, defining the removal path therebetween. In other embodiments, a single optical fiber 100 may be secured onto the holder 440 by the two attachment features 445a, 445b, defining the removal path therebetween. In this regard, though some embodiments may refer to a ribbon 200 being positioned within the holder for removal of the coating/matrix, it is understood, that a single coated optical fiber could instead be positioned within the holder for removal of the coating.

The nozzle may be positioned close to the surface of the ribbon to decrease the amount of time the heated gas is exposed to ambient conditions, so there is less of a temperature differential between when the gas leaves the nozzle and when it reaches the surface of the ribbon. In some embodiments, the nozzle may be positioned about 1 mm away from the surface, in other embodiments the nozzle may be 2 mm, 1.5 mm, 0.5 mm, 0.3 mm or 0.2 mm away from the surface of the ribbon.

The particulates from the matrix and/or the coating may be collected in an exhaust system below the ribbon to collect the coating and/or matrix particulates and expended gas.

Figure 4B:
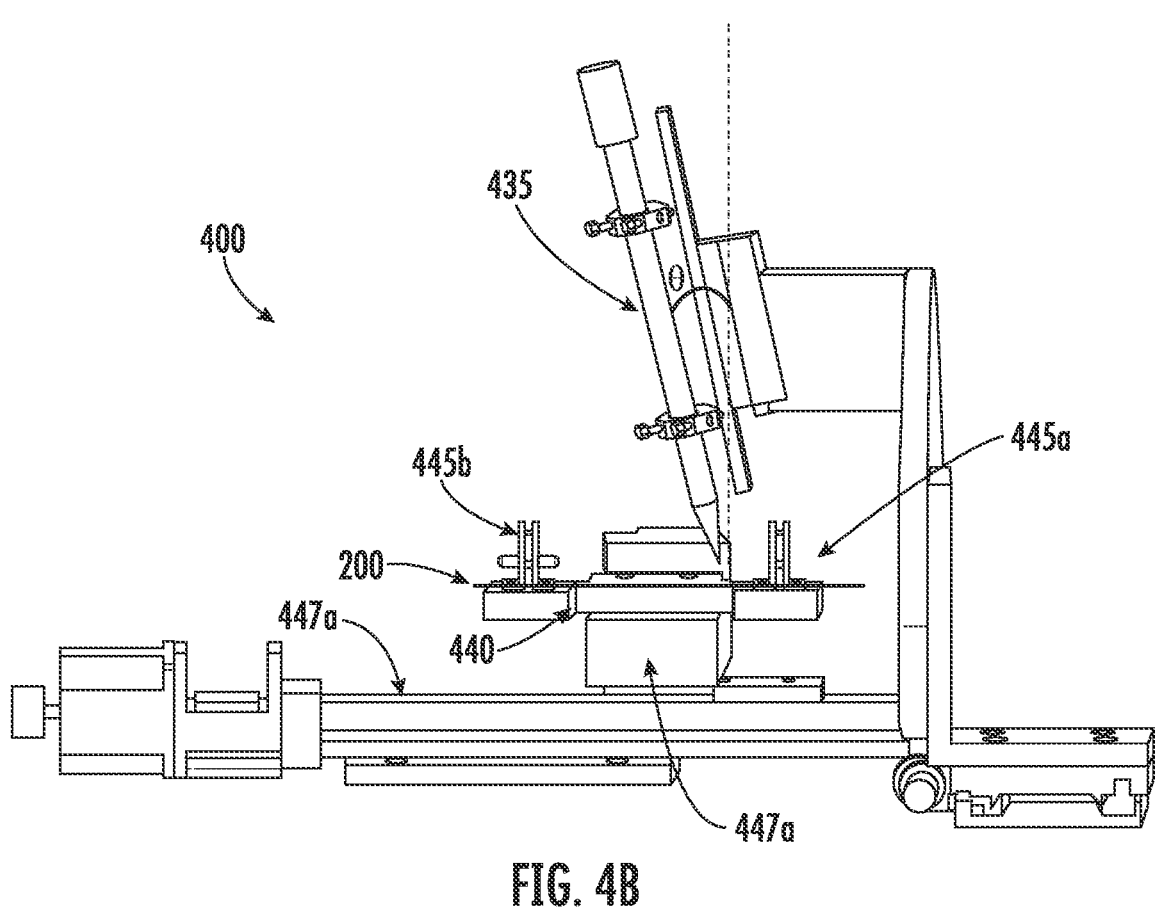
FIG. 4B illustrates a side view of the single nozzle system in the first position in accordance with some embodiments discussed herein.

In some embodiments, the nozzle of the system may have multiple degrees of freedom about the removal path to define a nozzle direction. The nozzle may be configured to have a pitch and/or an angular offset about the removal path of the ribbon. FIG. 4B illustrates an example configuration of system 400 having a pitch angle θ, and a zero-degree angular offset about the ribbon 200.

In some embodiments, the nozzle 435 is directed towards a ribbon 200 at a pitch angle θ. In some embodiments, the pitch angle may be measured from a plane perpendicular to the ribbon, wherein the plane indicates a pitch angle θ of 0 degrees. In some embodiments, the pitch angle θ may be greater than 3 degrees, greater than 5 degrees, or greater than 10 degrees. In some embodiments, the pitch angle θ is constant, while in other embodiments the pitch angle θ may change along length of the coated optical fiber.

Figure 4C:
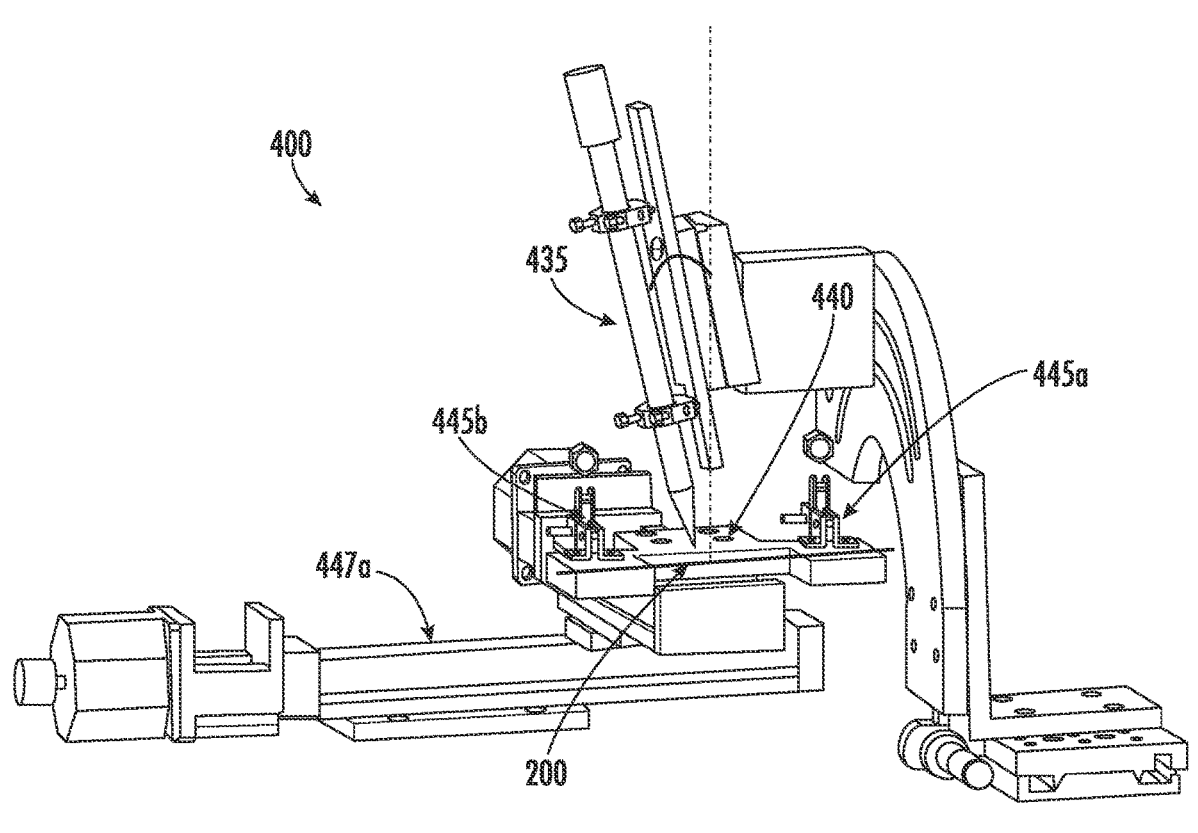
FIG. 4C illustrates a perspective view of the single nozzle system in a second position in accordance with some embodiments discussed herein.
Figure 4D:
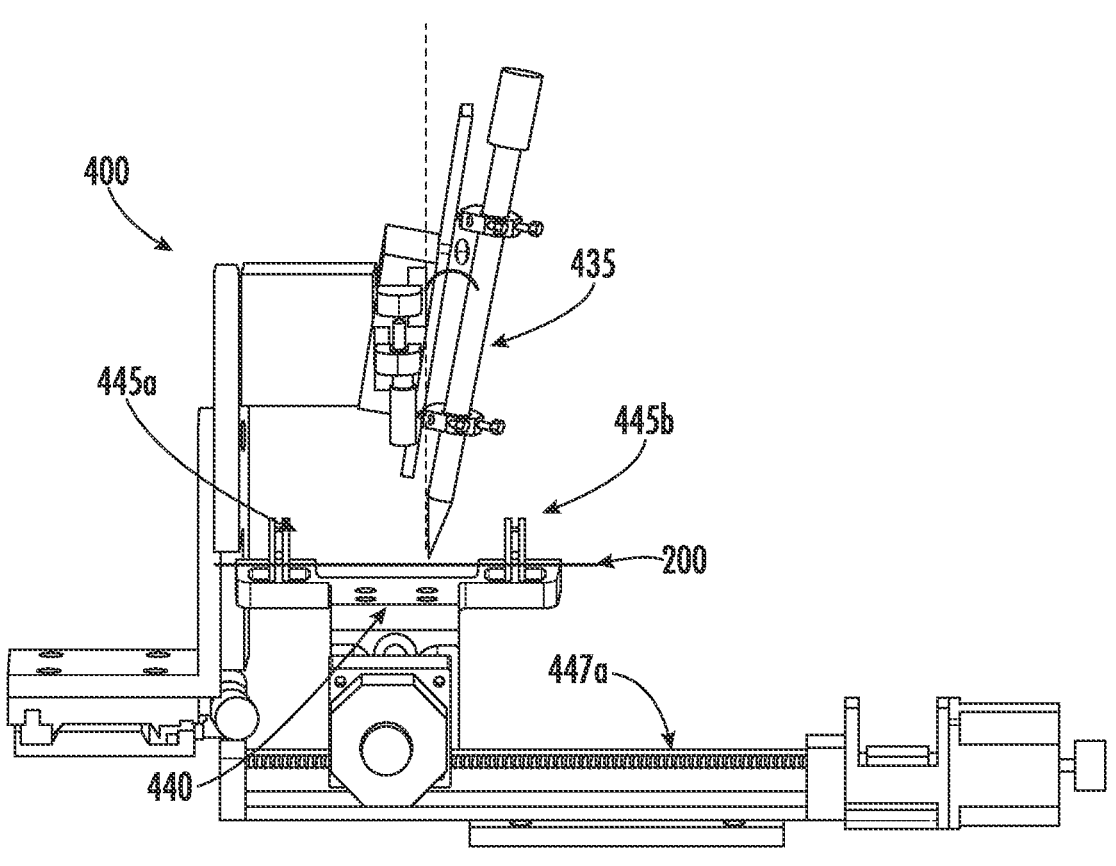
FIG. 4D illustrates a side view of the single nozzle system in the second position in accordance with some embodiments discussed herein.

In some embodiments, the pitch angle θ is directed towards the relative direction of movement of the ribbon. For example, if the ribbon is moving from the right to the left, the nozzle may be such that the bottom of the nozzle, the gas outlet, is to the left of the top of the nozzle, the gas inlet, as illustrated in FIGS. 4B and 4D. As illustrated in FIGS. 4A and 4C, showing the opposite side of the system 400, the bottom of the nozzle is to the left of the top of the nozzle, therefore the relative movement of the ribbon is from left to right. The heated gas is directed towards the coated portions of the ribbon or the coated optical fiber. This directional flow of heated gas works to prevent (or counteract) the coating from peeling back against the flow of heated gas as it passes over the coating. In this regard, the removal of the coating is clean with reduced curling. Notably, it has been observed that providing the heated gas at a non-zero pitch angle increases the efficient removal of the coating/matrix and results in less degradation of the optical fiber during the removal process.

The system may be configured to move relative to the removal path of the ribbon. FIGS. 4C-4D illustrate an example configuration of the system 400 in a second position. In some embodiments, the holder 440 may be mounted on a moving apparatus 447. The moving apparatus 447 may be configured to move the holder 440 relative to the removal path from a first position to a second position. In some embodiments, the moving apparatus may be configured to move the holder 440 perpendicular to the removal path, for example, to move the ribbon towards the continuous stream of heated gas, or to move the ribbon away from the continuous stream of heated gas. In some embodiments, moving apparatus is configured to move the holder parallel to, or along the removal path, for example the moving apparatus may move the holder such that the heated gas passes over a portion of the ribbon to be stripped. While in other embodiments, the moving apparatus is configured to move the holder 440 perpendicular and parallel to the removal path. For example, the moving apparatus 447 in FIG. 4C includes a first moving arm 447a that enables movement of the holder 440 parallel to the removal path (e.g., along a length of the arm 447a) and a second moving arm 447b that enables movement of the holder 440 perpendicular to the removal path (e.g., along a length of the arm 447b).

In some embodiments, the nozzle of the system may be configured to move relative to the removal path. The nozzle 435 or nozzle attachment features may be configured to move relative to the removal path, while the holder 440, and the ribbon remain stationary.

Once the ribbon 200 has passed through the continuous stream of heated gas, a stripped portion of the ribbon remains as illustrated in FIG. 10C.

Figure 5A:
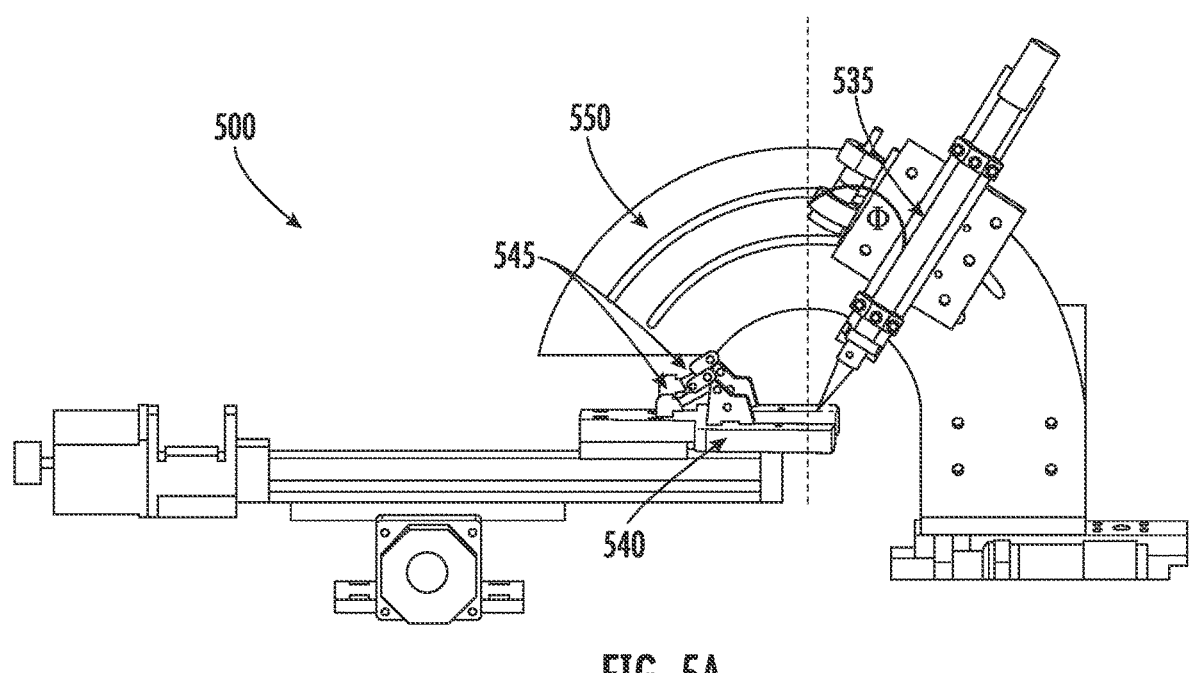
FIG. 5A illustrates a front view of the single nozzle system in accordance with some embodiments discussed herein.

In another example embodiment, the nozzle direction may be angularly offset about the ribbon without a pitch angle. FIG. 5A illustrates a front view of an example configuration of the system 500. The system 500 may include a nozzle 535, a holder 540, attachment features 545 and a nozzle holder 550. In some embodiments, the nozzle holder 550 is configured to provide the nozzle 535 with angular movement about the removal path. The nozzle holder 550 may be configured to allow the nozzle 535 to move, for example, up to 180 degrees about the removal path (although other degree ranges are contemplated, such as up to 90 degrees, up to 360 degrees, up to 45 degrees, etc.). In some embodiments, the nozzle holder may include at least one-track line to facilitate movement, and at least one clamp to secure the nozzle 535 in place.

Figure 5B:
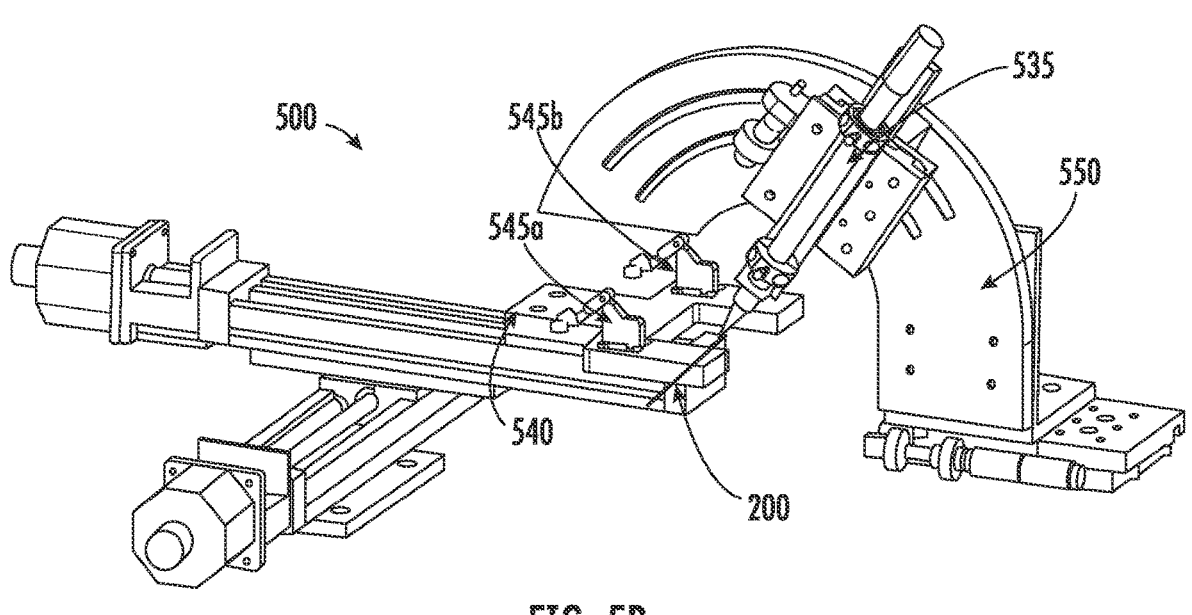
FIG. 5B illustrates a perspective view of the single nozzle system in accordance with some embodiments discussed herein.

FIG. 5B illustrates a perspective view of an example embodiment of the system 500. The nozzle 535 is angularly offset at an angle φ from the position directly above the ribbon 200 (shown in FIG. 5A), while being in the plane perpendicular to the removal path.

The molecules comprising the heated gas stream have both mass and velocity. The temperature of the gas impinging on the ribbon is proportional to the average kinetic energy of the molecules. When the nozzle is directly above the ribbon the molecules have a vectoral velocity that is primarily downward towards the ribbon, in the −z direction resulting in a stagnation point on the underside of the ribbon. Additionally, many of the molecules may also have velocity in the ±x and ±y directions. Therefore, the net pressure on the ribbon is in the −z direction, but the leading and trailing edges of the gas stream exert pressure in the −x and +x directions.

In some embodiments, the nozzle may be shifted to cause its direction of impingement on the ribbon to change (e.g., the nozzle holder 550 may move the nozzle 535 along its range of angles to redefine the angular position of the nozzle with respect to the ribbon). Rotating the nozzle, changes the stagnation point, and affords a distribution of heat and pressure about the underside of the ribbon, in addition to the top side facing the nozzle. In this regard, the angular displacement of the nozzle about the removal path may allow a portion of the continuous stream of heated gas to reach the underside of the ribbon. This causes more complete removal of the coating about the circumference of the optical fiber(s).

The changing momentum of the molecules between exiting the nozzle and contacting the ribbon, yields a temperature distribution across the x-direction, with the leading and trailing edges of the continuous stream of heated gas having lower effective temperatures since there may be fewer molecules that may transfer their energy to the coating molecules. Additionally, the ±x components of the pressure may contribute to peeling of the ribbon matrix beyond the desired portion.

In order to further reduce the stagnation point (or region), multiple nozzles may be used. A system may include multiple nozzles each with at least two different nozzle directions with respect to the removal path. FIGS. 6A-6B illustrate an example configuration of a system 600 including a first nozzle 635a and a second nozzle 635b angularly offset from one another by an offset angle α. In some embodiments, the offset angle α may be between 10 and 90 degrees, such that the momentum of the heated gas from one stream does not impinge on the second stream. In some embodiments, when measured from directly above the removal path, the first nozzle may be offset between 0 and 90 degrees counter-clockwise, while in some embodiments the second nozzle may be angularly offset between 0 and 90 degrees clockwise. In some embodiments, the first and second streams of heated gas are directed towards different portions about the perimeter of the ribbon. The system may further include similar components to previous embodiments, including a holder 640, attachment features 645, and a nozzle holder 650.

Each of the first nozzle and the second nozzle may be directed such that the stream of heated gas may contact the matrix or coating of the ribbon and/or optical fiber and reduce or eliminate the impact of a stagnation point. FIG. 6C illustrates a top perspective view of the example configuration of the system 600. The first nozzle 635a and the second nozzle 635b are adjacent to one another and are both directed towards a portion of the matrix. In the example embodiment, the stagnation point may be eliminated. Here the molecules of both continuous streams of heated gas are directed at different points about the ribbon. The first nozzle 635a and thereby the first continuous stream of heated gas are directed downward towards the ribbon, while the second nozzle 635b, and thereby the second continuous stream of heated gas are directed at the ribbon, but a different portion due to the angular offset of the second nozzle. In some embodiments, the first nozzle and the second nozzle may be configured to emit similar streams of heated gas, including the temperature, flow rate, exit pressure, and have the same height above the removal path. In other embodiments, the first continuous stream of heated gas and the second continuous stream of heated gas may be heated to different temperatures, yielding different contact temperatures, have different exit flow rates and pressures, and/or be placed at differing heights above the removal path.

Utilizing the dual nozzle with angular offset, allows the entirety of the matrix to be heated simultaneously, yielding a clean removal of the matrix and/or coating as the layers are all heated evenly.

Notably, however, in some embodiments, when the first nozzle 635a and the second nozzle 635b are adjacent to one another, the first continuous stream of heated gas and the second continuous stream of heated gas may interfere with one another-thereby lessening the desired results, and potentially introducing degradation to the underlying coated optical fibers and/or optical fibers. In order to reduce the degradation to the optical fibers, the nozzles, in a multiple nozzle configuration, may be staggered along the removal path (e.g., the nozzles may be in different lateral positions with respect to the removal path). The staggering may induce softening of the matrix coating followed by removal. In addition to staggering, one or more of the nozzles may include a pitch angle and/or angular offsets (such as described above). In some embodiments, the first continuous stream of heated gas may pre-heat the coating to soften the coating for more efficient removal due to interaction with the second continuous stream of heated gas. In some such examples, the first continuous stream of heated gas may have a different temperature than the second continuous stream of heated gas. For example, the first continuous stream of heated gas may be heated to a first temperature between 200° C. and 300° C., and the second continuous stream of the heated gas may be heated to a second temperature between 400° C. and 600° (although other ranges of temperatures are contemplated).

FIG. 7A illustrates a front view of an example configuration of system 700. The system 700 may include a first nozzle 735a and a second nozzle 735b offset angularly from one another by an offset angle α. The first nozzle 735a and the second nozzle 735b are slightly offset along the length of the ribbon 200 (e.g., laterally). The system may move from a first position wherein the ribbon is coated by the matrix, to a second position where the matrix and/or the coatings may be substantially removed. FIGS. 7B-7C illustrate side views of the example configuration of system 700 in the second position.

In some embodiments, wherein the two nozzles are offset along the removal path, one nozzle may provide heated gas to soften and heat the matrix layers, and the other nozzle may follow and provide heated gas such as to heat and increase the pressure within the inner matrix such as to form a bubble. When the pressure within the bubble is high enough, the bubble may burst leaving a clean coated optical fiber or optical fiber. In some embodiments, the softening nozzle may be perpendicular to the ribbon, and the bursting nozzle may have a pitch angle. In some embodiments, both the softening nozzle and the bursting nozzle may have a pitch angle. In some embodiments, either the softening or the bursting nozzle may be angularly offset.

In some embodiments, the first nozzle (e.g., the softening nozzle) may be configured with various exit properties (e.g., gas temperature, exit flow rate, exit pressure, and/or relative height to the optical fiber) and/or oriented to only soften the coating without reaching the optical fiber and/or only remove a portion of the coating without reaching the optical fiber. In such embodiments, the second nozzle (e.g., the bursting nozzle) may be configured with various exit properties (e.g., gas temperature, exit flow rate, exit pressure, and/or relative height to the optical fiber) and/or oriented to remove the remainder of the desired coating. For example, in the illustrated embodiment in FIG. 7B the second nozzle 735b may provide the stream of gas to soften the matrix, and the first nozzle 735a may provide the second gas stream, with a hotter temperature to allow the pressure to build faster within the inner matrix. In some embodiments, the first nozzle 735a may have the pitch angle, while the second nozzle 735b is perpendicular to the ribbon.

In some configurations, both nozzles may have a pitch angle. FIG. 8A illustrates a front view of system 800, having a first nozzle 835a and a second nozzle 835b angularly offset by offset angle α. FIGS. 8B-C illustrate side views of the system 800. The first nozzle 835a has a first pitch angle θ1 and the second nozzle 835b has a second pitch angle θ2. In some embodiments, the first pitch angle is greater than the second pitch angle, while in other embodiments the first pitch angle is smaller than the second pitch angle. In some embodiments, the first and second pitch angles may be equal.

In some configurations the system may be configured to collect the matrix and coating particulates expelled from the ribbon and/or coated optical fiber. FIG. 9 illustrates a front view of an example system 900 including a collection device 955. The collection device 955 may be connected to a vacuum 956 or other apparatus to trap and contain the particulates from the matrix and/or coating. In some embodiments, the collection device 955 may be radially opposite the nozzle direction with respect to the optical fiber so as to assist in catching of the removed coating that is blown off from the nozzle. Notably, FIG. 9 also illustrates example gas sources 957a, 957b and corresponding heaters 958a, 958b.

As noted above, although reference has been made to removing a matrix from a ribbon, the system may also be used to remove a coating from a single coated optical fiber or a coated optical fiber within the matrix.

Example Process

Temperature ranges of the heated gas may affect how the coating is removed from the ribbon. Differing temperature ranges may correspond to mass losses of the matrix and/or coating. In some embodiments, the temperature ranges may be determined to be zones with appropriate mass losses. In some embodiments, the first zone corresponds to a mass loss between 5% and 10%, by weight, of the coatings. The temperature in the first zone may be between 250° C. and 300° C. for the inner coating and between 280° C. and 330° C. for the outer coating.

It is important to note that may be undesirable to subject the ribbon to temperatures within the first zone, or temperatures higher than the first zone for an extended period of time, for example a few minutes, as there may be a detrimental impact to the integrity of the coatings. However, for the softening for the short time frame there may not be excess degradation.

In some embodiments, a second zone corresponds to a mass loss between 10% and 40% by weight of the coatings. In some embodiments, the temperature in the second zone may be between 290° C. and 350° C. for the inner layer, and between 320° C. and 420° C. for the outer layer. In this zone, the mass of the inner layer may decrease faster than the outer layer. Bubbles may form rapidly in the weakened layers however the bubbles may burst before enveloping the entire ribbon, leaving a peel sensation, similar to that illustrated in FIG. 3.

In some embodiments, a third zone corresponds to a mass loss between 40% and 70% by weight of the coatings. In some embodiments, the temperature ranges in the third zone are between 340° C. and 400° C. for the inner layers and between 410° C. and 460° C. for the outer layers. In this temperature range the coatings lose mass rapidly.

In some embodiments, a fourth zone may be utilized. In some embodiments the fourth zone may be when the mass loss of the coating is greater than 70% by weight of the coatings. The inner layer may reach this zone at temperatures above 390° C. However, in this zone, the inner layer may volatize before the formation of bubbles in the weakened outer layer and build up enough pressure to rupture. Resulting in the outer layer carbonizing rather than rupturing and leaving residue on the glass surface of the optical fiber. Although the zones are described within reference to coatings, the zones may apply to matrices, as the inner and outer layers of both optical fiber coatings and matrices may have similar polymer characteristics.

In some embodiments, a clean strip may occur when the inner layer has a temperature within the third zone, while the outer layer is still within the second zone. In such embodiments, the inner coating volatilizes rapidly, forming a bubble within the outer layer. The bubble may expand much faster, allowing the bubble to encircle the entire glass portion of the fiber. In such embodiments, the outer coating may be significantly weaker, thereby reducing the critical pressure needed for the bubbles to explode. The decreased critical pressure results in the matrix and/or coatings being removed from the entirety of the ribbon, not only the portion of the matrix and/or coatings directly in the heated gas stream.

A dual nozzle system, as discussed above, may allow the inner matrix to be preheated into the second zone, before the matrix is stripped from the coated optical fibers. In some embodiments, the preheating allows the matrix to soften. As the outer matrix has a higher melting point, it may be useful to use the softening method to afford a clean removal of the matrix.

In accordance with the zones described above, in some embodiments it may be beneficial to soften the matrix and/or coating to soften the matrix and afford easier removal. In some embodiments, a ribbon is secured between two attachment features and the streams of heated gas are directed towards the ribbon. FIG. 10A illustrates a segment of a ribbon 1000 comprised of multiple coated optical fibers 100 enclosed in a matrix 1025. The ribbon 1000 has a first end 1060 and a second end 1065, and a removal path 1070 defined between the first end and the second end. In some embodiments, a dual nozzle system, may direct streams of heated gas towards the ribbon 1000.

The two nozzles may be placed in accordance with one of the configurations of the systems illustrated in FIGS. 6A-9. The nozzles may be offset from one another along the length of the ribbon, angularly about the ribbon, and/or have a different pitch towards the ribbon. In some embodiments, the nozzles may be stationary, and the ribbon may move such that the first end 1060 begins under the streams of heated gas and the second end 1065 ends under the streams of heated gas.

As illustrated in FIG. 10A the system includes a first nozzle 1035a with a first gas stream 1055a and a second nozzle 1035b with corresponding second gas stream 1055b. The first gas stream 1055a may also be referred to as the removal (or bursting) stream and the second stream may be referred to as the softening stream.

In some embodiments, one or both of the softening stream and the removal stream begin over an attachment feature (e.g., over the first attachment feature 445a in FIG. 4A). In this regard, it has been observed that starting the gas stream over or immediately adjacent the attachment feature reduces the chance of forming an undesirable "peel" effect, such as at the beginning of the removal path. Likewise, ending one or both of the softening stream and the removal stream after encountering (or immediately adjacent to) the second attachment feature (e.g., the second attachment feature 445b in FIG. 4A at the end of the removal path) reduces the chance of forming an undesirable "peel" effect, such as at the end of the removal path. Notably, such focused starting and stopping points may be employed with more or less nozzles and/or a single optical fiber or ribbon.

In some embodiments, the ribbon is moved relative to the gas streams between the first end 1060 and the second end 1065, such that the gas streams passes over the ribbon starting at the first end 1060 and moving towards and ending at the second end 1065.

In some embodiments, the heated gas streams have different characteristics. For example, the softening gas stream 1055b may have a lower flow rate, and a higher temperature, to soften the inner matrix to make the removal of the matrix 1025 easier and more complete. In some embodiments, the removal stream may have a higher flow rate such as to expel the matrix from the coated optical fibers.

In some embodiments, the first and second continuous stream of heated gas may have flow rates between 10-30 SCFH, between 13-27 SCFH or between 15-25 SCFH. In some embodiments, the gas may exit the nozzle between 40-80 PSI, between 50-70 PSI or between 55-65 PSI. In some embodiments the relative velocity of the ribbon may be up to 15 mm/s, between 3-12 mm/s, or between 5-10 mm/s.

The dual nozzle stream improves the air flow about the ribbon. When a heated gas stream is aimed at a single coated optical fiber, the flow rate is such that the heat from the stream may encircle the optical fiber, which facilitates heating the coating about the optical fiber, including the portion opposite the fiber. However, when a ribbon is stripped, the flow rate of the heated gas changes. Unlike the small diameter of the coated optical fiber, a ribbon, which is made from multiple fibers, has more of a flat profile, creating a stagnation point on the side facing away from the stream of gas at approximately the center point of the ribbon. Since the gas cannot flow through the matrix material it is forced to move outward along the surface, and laminar boundaries are established. Further, when the gas reaches the edges of the ribbon, as there is an abrupt geometry change from flat to curved, free stress layers are initiated which curl away behind the solid. As such there is little convective air flow reaching the surface facing away from the nozzle emitting the host gas stream. This effect is more pronounced as the ribbon contains more optical fibers.

In some embodiments, the nozzle may include a designed outlet shape. For example, the outlet shape of the nozzle may be circular in some embodiments. In other embodiments, the outlet shape of the nozzle may be elliptical or oval and the greater length part of the elliptical or oval shape may run perpendicular to the removal path. In such embodiments, the gas may be directed along a width part of a ribbon, which may provide for more efficient removal, such as around the abrupt geometry changes and/or along the elongated width sections of the ribbon. Other outlet shapes are also contemplated.

Similar to as noted above, although reference has been made to removing a matrix from a ribbon, the processes described herein may also be used to remove a coating from a single coated optical fiber or a coated optical fiber within the matrix.

Example Flowchart(s)

FIG. 11 is a flow chart illustrating an example method 1100 for removing the matrix and/or coating off of a ribbon and/or optical fiber(s), in accordance with some embodiments discussed herein. Various components of the systems described herein may perform various operations of the example flow chart. Notably, while the following flow chart details operations in a certain order, any such operations may be performed in any order and/or simultaneously, such as is consistent with described embodiments herein.

At operation 1110, the gas is heated. At operation 1120, the matrix and/or optical fiber is secured in a holder. At operation 1130, at least one stream of the heated gas is aimed at the matrix of the ribbon, or the coating of the coated optical fiber. At operation 1140, the matrix or the coated optical fiber is moved relative to the stream of heated gas. In some embodiments, the holder of the ribbon or coated optical fiber may be moved, while in other embodiments the heated gas stream may be moved along the ribbon or the coated optical fiber. At operation 1150, the matrix or the coating is removed from the ribbon and/or the coated optical fiber.

CONCLUSION

It will therefore be readily understood by those persons skilled in the art that the present invention is susceptible of broad utility and application. Many embodiments and adaptations of the present invention other than those herein described, as well as many variations, modifications, and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications, and equivalent arrangements.

The invention claimed is:

1. A system for removing a coating from a portion of a coated optical fiber, the system comprising:

a gas source for providing gas;

a heater configured to heat the gas to form heated gas;

a base;

a holder mounted to the base and comprising a first attachment feature and a second attachment feature, wherein the first attachment feature and the second attachment feature are configured to secure the coated optical fiber along a removal path such that the portion of the coated optical fiber is exposed between the first attachment feature and the second attachment feature;

at least one nozzle connected to the gas source, wherein the at least one nozzle is aimed in a nozzle direction that is toward the removal path at a pitch angle such that the nozzle direction is non-perpendicular to the removal path, wherein the at least one nozzle directs a continuous stream of the heated gas towards the coated optical fiber to cause the coating of the coated optical fiber to be removed therefrom; and a nozzle holder defining an arcuate track, wherein the at least one nozzle is mounted to the nozzle holder and translatable along the arcuate track to angularly displace the nozzle to the removal path, wherein the holder is configured to be moveable parallel to the removal path relative to the base and the continuous stream of the heated gas.

2. The system of claim 1, wherein the coated optical fiber is a ribbon with a plurality of coated optical fibers surrounded by a matrix.

3. The system of any claim 1, wherein the at least one nozzle is configured to be moveable parallel to the removal path.

4. The system of claim 1, wherein the at least one nozzle comprises a first nozzle and the continuous stream of the heated gas comprises a first continuous stream of heated gas, wherein the system further comprises a second nozzle directing a second continuous stream of heated gas towards the coated optical fiber, wherein the second nozzle is axially displaced about the removal path with respect to the first nozzle such that the first continuous stream of heated gas is aimed at a first point about a circumference of the coated optical fiber and the second continuous stream of heated gas is aimed at a second point about the circumference of the coated optical fiber, wherein the first point is different than the second point.

5. The system of claim 4, wherein the first nozzle and the second nozzle are offset along the removal path.

6. The system of claim 5, wherein the first nozzle is positioned along the removal path downstream of the second nozzle such that the first continuous stream of heated gas contacts the coated optical fiber prior to the second continuous stream of heated gas, wherein the first continuous stream of heated gas is directed toward the coated optical fiber at a flow rate and a temperature designed to only soften the coating of the optical fiber such that the first continuous stream of heated gas is not designed to fully remove the coating.

7. The system of claim 4, wherein the first nozzle directs the first continuous stream of heated gas towards the coated optical fiber at a first pitch angle, and the second nozzle directs the second continuous stream of heated gas towards the coated optical fiber at a second pitch angle, wherein the first pitch angle and the second pitch angle are different.

8. The system of claim 4, wherein the first continuous stream of heated gas is heated to a first temperature between 200° C. and 300° C., and the second continuous stream of the heated gas is heated to a second temperature between 400° C. and 600° C.

9. The system of claim 1, further comprising a collection device configured to collect removed coating of the coated optical fiber, wherein the collection device is radially opposite the at least one nozzle with respect to the optical fiber.

10. The system of claim 1, wherein the pitch angle is greater than 5 degrees when measured from a plane perpendicular to the removal path.

11. The system of claim 1, wherein the gas is an inert gas.

12. The system of claim 1, wherein the heater heats the gas to a temperature between 40° and 600° C.

13. The system of claim 1, wherein the at least one nozzle has a flow rate between 40 standard cubic feet per hour, and 80 standard cubic feet per hour.

14. The system of claim 1, wherein the coated optical fiber has a diameter of less than 125 microns.

15. The system of claim 1, wherein the base comprises:

a first moving arm, wherein the holder is moveable along the first moving arm in a direction parallel to the removal path; and a second moving arm, wherein the holder is moveable along the second moving arm in a direction perpendicular to the removal path.

16. A method of removing a coating from a portion of a coated optical fiber, the method comprising:

providing gas from a gas source;

heating the gas with a heater;

securing the portion of the coated optical fiber in a holder between a first attachment feature and a second attachment feature, wherein the holder is mounted to a base and wherein the coated optical fiber defines a removal path there between;

aiming a continuous stream of heated gas through at least one nozzle towards the holder wherein a nozzle holder defines an arcuate track and the at least one nozzle is mounted to the nozzle holder and translatable along the arcuate track to angularly displace the nozzle to the removal path, wherein the at least one nozzle is directed towards the removal path at a pitch such that a direction of the at least one nozzle is non-perpendicular to the removal path; and moving the holder relative to the base and the at least one nozzle such that the continuous stream of heated gas passes from the first attachment feature, along the portion of the coated optical fiber, to the second attachment feature, thereby removing the coating along the portion, wherein the continuous stream of heated gas begins over or at an edge of the first attachment feature to clean strip the coating from the coated optical fiber.

17. The method of claim 16, wherein the at least one nozzle is a first nozzle and a second nozzle, wherein the first nozzle and the second nozzle are offset from each other at least one of angularly or laterally with respect to the removal path.

18. The method of claim 16, further comprising:

moving the holder relative to the continuous stream of heated gas such that the continuous stream of heated gas intersects the first attachment feature and an axis of the coated optical fiber; and moving the holder perpendicularly away from the continuous stream of heated gas intersecting the second attachment feature to remove the axis of the coated optical fiber from intersection with the continuous stream of gas.

19. A system for removing a coating from a portion of a coated optical fiber, the system comprising:

a gas source for providing gas;

a heater configured to heat the gas to form heated gas;

a base;

a holder mounted to the base and comprising a first attachment feature and a second attachment feature, wherein the first attachment feature and the second attachment feature are configured to secure the coated optical fiber along a removal path such that the portion of the coated optical fiber is exposed between the first attachment feature and the second attachment feature;

a first nozzle connected to the gas source, configured to aim a first continuous stream of heated gas towards the coated optical fiber in a first nozzle direction to cause the coating of the coated optical fiber to soften;

a nozzle holder defining an arcuate track, wherein the first nozzle is mounted to the nozzle holder and translatable along the arcuate track to angularly displace the nozzle to the removal path; and a second nozzle connected to the gas source, configured to aim a second continuous stream of heated gas towards the softened coating of the coated optical fiber in a second nozzle direction to cause the softened coating of the optical fiber to be removed therefrom and to expose the optical fiber, wherein the holder is configured to be moveable parallel to the removal path relative to the base such that the first continuous stream of heated gas contacts the coating of the coated optical fiber before the second continuous stream of heated gas.

20. The system of claim 19, wherein the first continuous stream of heated gas has a first temperature and a first flow rate, and the second continuous stream of heated gas has a second temperature and a second flow rate, wherein the first temperature is different than the second temperature, and the first flow rate is different than the second flow rate.

* * * * *